United States Patent
Jardine et al.

(10) Patent No.: US 6,241,796 B1
(45) Date of Patent: Jun. 5, 2001

(54) METHOD FOR PRODUCING FERTILIZER GRADE DAP HAVING AN INCREASED NITROGEN CONCENTRATION FROM RECYCLE

(75) Inventors: Kenneth J. Jardine; Vaughn V. Astley, both of Lakeland, FL (US)

(73) Assignee: IMC-Agrico Company, Bannockburn, IL (US)

( * ) Notice: Subject to any disclaimer, the term of this patent is extended or adjusted under 35 U.S.C. 154(b) by 0 days.

(21) Appl. No.: 09/357,830

(22) Filed: Jul. 21, 1999

(51) Int. Cl.$^7$ .................................................. C05B 7/00
(52) U.S. Cl. .................. 71/35; 71/34; 423/308; 423/310
(58) Field of Search .................. 71/34, 35; 423/308, 423/310, 312

(56) References Cited

U.S. PATENT DOCUMENTS

| | | | |
|---|---|---|---|
| 3,425,819 | * 2/1969 | Barry et al. ............................. | 71/35 |
| 4,485,078 | 11/1984 | Weston et al. . | |
| 4,487,750 | 12/1984 | Astley et al. . | |
| 4,592,771 | * 6/1986 | Benjamin et al. ....................... | 71/34 |
| 4,619,684 | * 10/1986 | Salladay et al. ......................... | 71/34 |
| 4,655,789 | 4/1987 | Wiewiorowski et al. . | |
| 4,655,790 | 4/1987 | Wiewiorowski et al. . | |
| 4,657,559 | 4/1987 | Mollere et al. . | |
| 4,710,366 | 12/1987 | Astley et al. . | |
| 4,744,965 | * 5/1988 | Fairchild .................................. | 71/34 |

OTHER PUBLICATIONS

Official Publication No. 52 (1999), title page, and pp. ii to v and 63, Association of American Plant Food Control Officials, (No month).

*Manual of Fertilizer Processing,* Marcel Dekker, Inc. (1987), pp. 248 to 251, (No month).

*The Merck Index,* 10$^{th}$ Edition (1983), p. 561, (No month).

\* cited by examiner

*Primary Examiner*—Wayne Langel
(74) *Attorney, Agent, or Firm*—Fisher, Christen & Sabol

(57) ABSTRACT

A process for the preparation of granular fertilizer grade DAP (a product composed of ammonium phosphates, principally diammonium phosphate, resulting from the ammoniation of phosphoric acid, as defined in Official Publication No. 52 of the Association of American Plant Food Officials, dated 1999) comprising partially preneutralizing orthophosphoric acid with ammonia, completing the ammoniation of the orthophosphoric acid with ammonia in a rotary ammoniator-granulator to provide granular DAP, sizing the granular DAP to provide the granular DAP product, reducing the particle size of the oversized granular DAP, and recycling the undersized granular DAP and the sized-reduced oversized granular DAP to the ammoniator-granulator. The ammoniacal nitrogen concentration of the granular DAP recycle, hence the granular DAP product, is enhanced by subjecting the finely-divided recycled granular DAP to anhydrous gaseous ammonia which is at a super atmospheric pressure and which is at a temperature sufficient to maintain said anhydrous ammonia in the gaseous state. The increase in the ammoniacal nitrogen concentration is a function of the absolute ammonia pressure, the initial moisture content of the granular DAP recycle, and the contact time of the ammonium with the granular DAP recycle.

22 Claims, 7 Drawing Sheets

METHOD FOR PRODUCING FERTILIZER GRADE DAP HAVING AN INCREASED NITROGEN CONCENTRATION FROM RECYCLE

This application is related to the application entitled "Method for Producing Fertilizer Grade DAP Having an Increased Nitrogen Concentration In a Spray Column", filed concurrently herewith.

BACKGROUND OF THE INVENTION

1. Field of the Invention

The invention relates to a method of enhancing the nitrogen concentration of fertilizer grade DAP. Fertilizer grade DAP is defined in Official Publication No. 52 (1999) of the Association of American Plant Food Control Officials as a product composed of ammonium phosphates, principally diammonium phosphate, resulting from the ammoniation of phosphoric acid. It may contain up to 2 percent non-ammoniacal nitrogen. The guaranteed percentage of nitrogen and available phosphate shall be stated as part of the name.

2. Background of the Invention

Phosphorus as well as nitrogen are essential plant nutrients. Phosphorus and nitrogen ensure cell multiplication and thus growth since both are structural components of nucleic acids. Plants use the phosphorus and nitrogen to grow. Since fertilizers are generally formed by the reaction of phosphoric acid and ammonia, they are used to provide a rich source of nitrogen and phosphorus to the plants. Such fertilizers are generally applied to the soil and are readily assimilable by plants.

The phosphoric acid used in fertilizers is usually manufactured from rock phosphate typically in one of two ways. Phosphate rock is composed chiefly of calcium phosphates and calcite.

In the first prior art method, commonly known as the furnace acid process, the phosphoric acid is made by heating phosphate rock to a form of relatively pure elemental phosphorus which is then converted into the phosphoric acid. More particularly, this prior art process uses an electric furnace heated to about 1500° K. The phosphate rock is reduced by coke in the presence of sand or silicon dioxide according to the following reaction:

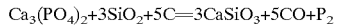

Gaseous $P_2$ condenses to form a solid $P_4$. In the air, the $P_4$ converts to phosphorus pentoxide. Water is then added to the phosphorus pentoxide to form the phosphoric acid. The process usually yields 85 percent phosphoric acid which is colorless and has a density of about 1.69 kg/L. The phosphoric acid formed by this prior art process generally yields a purer phosphoric acid as compared to the phosphoric acid formed by the second prior art process, which is described below. However, this first process is also much more costly than the second prior art process.

The second prior art method used to produce phosphoric acid is known as the wet process. Most of the phosphoric acid produced in the United States is produced by this process. In this wet process, finely ground phosphate rock is slurried with sulfuric acid. Sometimes, recycled dilute phosphoric acid is included in the slurry. The reaction that occurs in this wet process is set forth below:

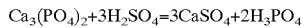

In addition to the orthophosphoric acid, the reaction yields gypsum and numerous other suspended and dissolved impurities. The slurry is generally filtered to remove the solid impurities, mainly, gypsum. The resultant filtrate contains between 25 and 35 percent $P_2O_5$ and between 1 and 8 percent by weight of suspended solids or impurities that are not removed by the filtration process. Examples of wet process methods are disclosed in U.S. Pat. Nos. 4,487,750, 4,485,078, 4,657,559, 4,665,790 and 4,655,789, which are incorporated herein in their entirety. U.S. Pat. No. 4,710,366 discloses methods of removing further impurities from the filtrate; such patent is incorporated herein in its entirety.

As used herein, the terms phosphoric acid and wet process phosphoric acid mean orthophosphoric acid.

Phosphoric acid is reacted with anhydrous ammonia to form ammonium phosphates, which constitute a large class of phosphorus fertilizers. See Examples 7 and 9 of U.S. Pat. No. 4,485,078. The common ammonium phosphates include monoammonium phosphate and diammonium phosphate, which are the primary components of the fertilizers commonly known as MAP and DAP, respectively. DAP (fertilizer grade) is a product composed of ammonium phosphates, principally diammonium phosphate, resulting from the ammoniation of phosphoric acid. The phosphoric acid is preferably reacted with the proper proportion of anhydrous ammonia which primarily provides diammonium phosphate, which is a source of nitrogen and phosphorus readily assimilable by food crops.

The TVA (Tennessee Valley Authority) in the early 1960s developed a process for the preparation of granular DAP from ammonia and phosphoric acid. The conventional TVA process for preparing granular DAP is described on pages 248 to 251 of *Manual of Fertilizer Processing*, edited by Francis T. Nielsson, Marcel Dekker, Inc., (1987). The conventional TVA type of process has a preneutralizer for partial ammoniation of the phosphoric acid and completion of ammoniation is done in a rotary ammoniator-granulator. Granulation is controlled by recycling product fines to the drum. The basic TVA process involves partial preneutralization of the acid in a preneutralizer (reaction tank) followed by completion of ammoniation to DAP in the rotary ammoniator-granulator. Excess ammonia, which must be fed to the ammoniator-granulator to produce DAP, is recovered by scrubbing the off gases with the acid to be used in the process. The granular product is normally dried, cooled, and screened, having the undersized and crushed oversized granular DAP recycled to the granulator to control granulation.

Pure diammonium phosphate $[(NH_4)_2HPO_4]$ is also termed dibasic ammonium phosphate. Page 561 of *The Merck Index*, 10th Ed., (1983), states that diammonium phosphate gradually loses about 8 percent $NH_3$ on exposure to air.

Triammonium phosphate is $(NH_4)_3PO_4$.

BROAD DESCRIPTION OF THE INVENTION

An object of the invention is to provide a process for enhancing the ammoniacal nitrogen concentration of DAP. Another object of the invention is to provide a process for producing DAP fertilizer with the nitrogen and phosphate concentrations required for international trade, using the lower quality orthophosphoric acid currently being produced, without using expensive nitrogen supplements. A further object of the invention is to provide a process for the production of fertilizer grade diammonium phosphate. Other objects and advantages of the invention are set forth herein or are obvious herefrom to one skilled in the art.

The objects and advantages of the invention are achieved by the process of the invention.

There currently exists a need for a process to produce ammonium phosphate from orthophosphoric acid having a high concentration of impurities. Furthermore, a need exists for increasing the nitrogen content of DAP used for fertilizers. The invention provides a solution to such needs.

It has been found that reacting finely divided DAP with high pressure, anhydrous, gaseous ammonia will enhance or increase the ammoniacal nitrogen concentration of the DAP, but such treated DAP has the disadvantages that, as it ages, it tends to lose significant amounts of the added nitrogen and to gain excessive moisture.

The invention involves a process for enhancing the ammoniacal nitrogen concentration of DAP. The DAP, which is in finely divided form, is subjected to anhydrous gaseous ammonia, which is at a super atmospheric pressure and which is at a temperature sufficient to maintain the ammonia in the gaseous state. The increase in the ammoniacal nitrogen concentration is a function of the absolute ammonia pressure, the initial moisture content of the DAP and the contact time of the ammonia with the DAP. The enhancement of the ammoniacal nitrogen content of the DAP is also a function of the particle size of the DAP.

The DAP should be de-aerated before it is treated with the gaseous ammonia. The ammonia may have converted some of the DAP to triammonium phosphate and/or been adsorbed by the DAP.

A preferred embodiment of the invention process involves modification or improvement of the conventional TVA process, or such type of process, for the preparation of granular DAP from ammonia and orthophosphoric acid.

The conventional TVA type of process has a preneutralizer for partial ammoniation of the phosphoric acid and a rotary ammoniator-granulator for completion of the ammoniation. Granulation is controlled by recycling product fines to the drum. The TVA process involves partial preneutralization of the acid in a preneutralizer (reaction tank) followed by completion of ammoniation to DAP in the rotary ammoniator-granulator. Excess ammonia, which must be fed to the ammoniator-granulator to produce DAP, is recovered by scrubbing the off gases with the acid to be used in the process. The granular product is normally dried, cooled, and screened, with the undersized and crushed oversized granular DAP being recycled to the granulator to control granulation.

Such preferred embodiment, as already stated, involves improving the conventional TVA type of process for the preparation of granular DAP product. The conventional TVA type of process involves partially preneutralizing orthophosphoric acid with ammonia, completing the ammoniation of the orthophosphoric acid in a rotary ammoniator-granulator to provide granular DAP, sizing the granular DAP to provide the granular DAP product, reducing the particle size of the oversized granular DAP, and recycling the undersized granular DAP and the sized-reduced oversized granular DAP to the ammoniator-granulator. The invention involves the improvement of enhancing the ammoniacal nitrogen concentration of the granulated DAP recycle, hence the granular DAP product, by subjecting the finely-divided granular DAP recycle to anhydrous gaseous ammonia which is at a super atmospheric pressure and which is at a temperature sufficient to maintain the anhydrous ammonia in the gaseous state. The increase in the ammoniacal nitrogen concentration is a function of the absolute ammonia pressure, the initial moisture content of the granular DAP recycle, and the contact time of the ammonia with the granular DAP recycle. The enhancement of the ammoniacal nitrogen content of the DAP is also a function of the particle size of the granular DAP recycle.

Recycle in the invention process can include dust from the granulator.

The independent functions (variables) which provide increase in ammoniacal nitrogen concentration in the invention process can be represented with more particularity by the following regression equation:

% Nitrogen Increase=0.355×Initial % Moisture+0.027×Contact Time (min.)+0.009×NH$_3$ Pressure (psia)−0.240 wherein the coefficients associated with the three independent functions (variables), i.e., the absolute ammonia pressure, the initial percent moisture and the contact time, can each vary plus or minus up to 50 percent (and still be within the scope of the regression equation). The dependent variable "% Nitrogen Increase" represents the increase of the ammoniacal nitrogen concentration. The coefficients in the above regression equation are based on the combined data from Tables 6 and 10 below. As mentioned above, the coefficients of the above regression equation can each vary plus or minus 50 percent, but note that such coefficients may vary an even greater magnitude, and still be within the scope of the above regression equation, for wet process phosphoric acid with a significantly different combination of impurities.

Conducting the invention process according to the above regression formula provides DAP which has enhanced ammoniacal concentration and which is stable (i.e., as to the enhanced ammoniacal concentration) upon aging.

The invention process provides fertilizer grade DAP, a product composed principally of diammonium phosphate, as defined in Official Publication No. 52 of the Association of American Plant Food Control Officials, dated 1999. The preferred process enhances the ammoniacal nitrogen concentration of DAP above what can normally be obtained, with a given orthophosphoric acid quality, in the standard TVA style DAP plant using a preneutralizer and granulator. The additional ammoniacal nitrogen is obtained by producing and incorporating a variable amount of triammonium phosphate into the DAP granular product and/or adsorbing a variable amount of ammonia on the surface and in the pores of the granular DAP, and incorporating this material into the DAP product.

The DAP recycle treated according to the invention process is finely divided. The particle size of the finely-divided DAP recycle is generally −9 mesh or less. The broad range for the particle size is smaller than 6.83 mm (3 mesh Tyler sieve size) with no theoretical lower limit. The preferred particle size range is smaller than 2.00 mm (9 mesh Tyler sieve size) and larger than about 0.01 mm (10 microns).

The ammonia gas pressure used is super atmospheric, with the ammonia gas pressure being preferably 15 to 100 psia (and more preferably 30 to 85 psia). There are two basic reasons that the upper limit for the preferred ammoniation pressure is 100 pounds per square inch gauge (psig) or 114.7 pounds per square inch absolute (psia). First, the codes (ASTM) regulating the fabrication of pressure vessels make a vessel rated for pressures up to 100 psig. Second, once the pressure gets significantly about 100 psig, parts of the process may require the addition of heat (during periods of extremely cold ambient temperatures) to avoid condensation of the ammonia.

The theoretical upper limit to the ammoniation pressure range would be the critical pressure for ammonia (11 1.5 atmospheres absolute or about 1624 pounds per square inch gauge pressure). If the ammonia temperature is less than or equal to the critical temperature for ammonia (405.5° Kelvin or 270.68° F.), ammonia cannot exist as a gas at or above the critical pressure. In functional language, this can be stated as the region in terms of pressure and temperature where ammonia exists in the gaseous state.

The contact time of the pressurized gaseous ammonia with the DAP recycle should be sufficient to allow the required amount of triammonium phosphate to be formed by chemical reaction and/or the required amount of ammonia to be adsorbed. The contact time is broadly between about 10 seconds and 2 hours, preferably 5 minutes to one hour.

The temperature of the pressurized gaseous ammonia is generally between about 450 and about 200° F. The broad temperature range for the ammonia is at least 32° F. (0° C.) and not more than 250° F. (121.1° C.) when it enters the pressure reactor. The preferred temperature range is at least 55.4° F. (13° C.) and not more than 175° F. (79.4° C.) when it enters the pressure reactor.

The initial moisture ($H_2O$) content of the DAP recycle is generally between about 0.2 to about 4 percent, preferably about 0.5 to 3.5 percent.

One especially preferred method involves de-aerating the granular DAP recycle in a first sealed vessel by the application of vacuum. The de-aerated granular DAP recycle is subjected in a second sealed vessel to an atmosphere consisting of anhydrous gaseous ammonia which is at a pressure of at least 15 psia, for a time period sufficient for the required amount of triammonium phosphate to be formed and/or the required amount of ammonia to be adsorbed. The ammonia-treated granular DAP recycle is transferred to a third sealed vessel and the excess ammonia is removed by vacuum applied to the third vessel. The vacuum-treated, ammonia-treated granular DAP recycle is recycled to the ammoniator-granulator.

Another especially preferred method involves placing the granular DAP recycle in a sealed vessel, de-aerating the granular DAP recycle by the application of vacuum to the sealed vessel, feeding anhydrous gaseous ammonia into the sealed vessel until a pressure of at least 15 psia is obtained in the sealed vessel, and keeping the granular DAP recycle in contact with the ammonia in the sealed vessel for a time period sufficient for the required amount of triammonium phosphate to be formed and/or the required amount of ammonia to be adsorbed. At the end of the time period, the excess ammonia is removed by vacuum applied to the sealed vessel. The vacuum-treated, ammonia-treated DAP recycle is recycled to the ammoniator granulator.

Another method of operating the process includes introducing a portion of the DAP recycle into an entry lock vessel at atmospheric pressure (with no effort to remove the air that enters the vessel with the recycle). This vessel is then pressurized with gaseous ammonia such that the total pressure is essentially equal to the total pressure in a second reactor vessel, the gas in this second reactor vessel being a mixture containing no more than 15 percent air and no less than 85 percent ammonia. A valve connecting the entry lock vessel and reactor vessel is then opened and the DAP recycle is allowed to flow into the reactor vessel. The valve connecting the entry lock vessel and reactor vessel is then closed and the gas in the entry lock vessel is vented to another part of the process, such that the ammonia contained in the gas can be recovered in a useful manner. The primary objective of the venting step is to reduce the pressure in the entry lock vessel to atmospheric pressure, such that additional DAP recycle can be introduced into the entry lock vessel. The DAP recycle that is now in the reactor vessel is kept in the reactor vessel, in contact with the ammonia atmosphere at elevated pressure, for a period of time (i.e., the reaction time) sufficient to allow the required amount of triammonium phosphate to be formed by chemical reaction, and/or the required amount of ammonia to be adsorbed. While the DAP recycle is in the reactor vessel, an exit lock vessel is pressurized with ammonia, such that the total pressure in the exit lock vessel is essentially equal to the total pressure in the reactor vessel. At the end of the reaction time a valve connecting the reaction vessel with the exit lock vessel is opened and the ammonia enriched recycle is allowed to flow into the exit lock vessel. The valve connecting the reaction vessel with the exit lock vessel is then closed. At this time, additional DAP recycle can be introduced into the reaction vessel in the manner indicated above. After the valve connecting the reaction vessel with the exit lock vessel is closed, the gas in the exit lock vessel is vented to another part of the process, such that the ammonia contained in the gas can be recovered in a useful manner. The primary objective of the venting step is to reduce the pressure in the exit lock vessel to atmospheric pressure. A second valve on the exit lock vessel is then opened and the ammonia enriched recycle is removed from the exit lock vessel and transferred to the ammoniator granulator where it is incorporated into the DAP product.

DETAILED DESCRIPTION OF THE INVENTION

The invention provides a process for increasing the amount of nitrogen in a diammonium phosphate composition. The result is fertilizer grade DAP, as defined in Official Publication No. 52 of the Association of American Plant Food Control Officials, dated 1999.

The invention provides a method for producing DAP fertilizer with the lower quality phosphoric acid currently being produced, without using expensive nitrogen supplements. The invention process can also produce a higher analysis fertilizer with, for example, a phosphate concentration (expressed as percent $P_2O_5$) of about 48 percent and an ammonia concentration (expressed as percent N) of about 20 percent.

The purpose of enhancing such nitrogen concentration of the DAP is so that it can be used as nitrogen rich fertilizer without having to use expensive nitrogen supplements. The reacting of finely divided DAP with high pressure, anhydrous, gaseous ammonia enhances or increases the ammoniacal nitrogen concentration of the DAP. Such ammonia-treated DAP is not suitable as a nitrogen rich fertilizer because it lacks the necessary stability since as it ages it tends to lose significant amounts of the added nitrogen and to gain excessive moisture. These disadvantages are present even after aging for only two weeks.

Figure 1:
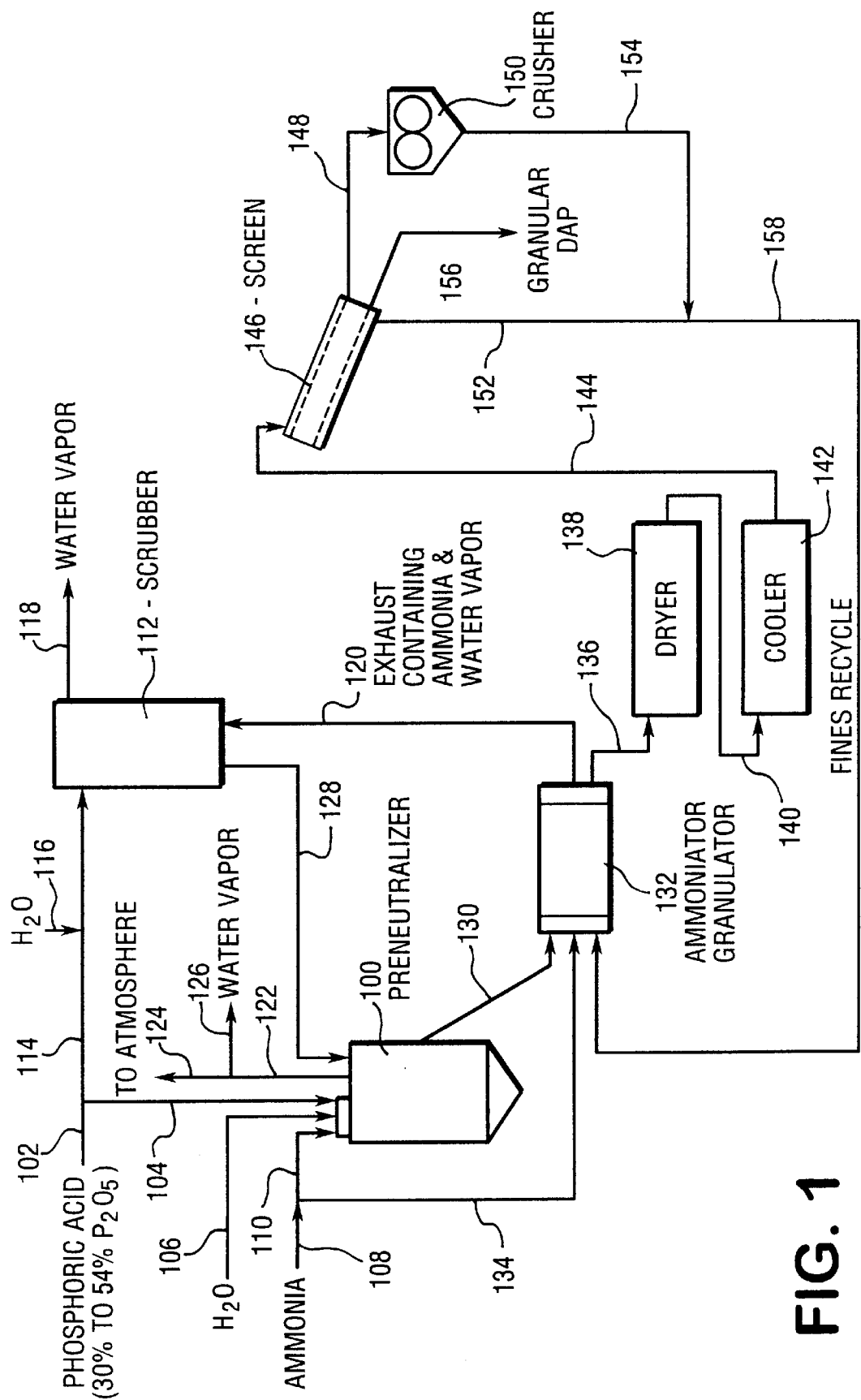
FIG. 1 is a schematic of a conventional TVA process for the production of granular DAP.

The flow path of a conventional TVA (Tennessee Valley Authority) process for the production of granular DAP is shown in FIG. 1. Phosphoric acid (30 to 54 percent $P_2O_5$) is fed into the top of the preneutralizer (reaction tank) 100 via lines 102 and 104. Water is fed into the top of the preneutralizer 100 via line 106. Ammonia is fed into the preneutralizer 100 via lines 108 and 110, and is normally conveyed to a point below the liquid level in the tank. The phosphoric acid is partially preneutralized by the ammonia in preneutralizer 100. The heat of reaction of ammonia and phosphoric acid is used to evaporate water in preneutralizer 100. Preneutralizer 100 is vented to the atmosphere via top lines 122 and 124 with water vapor coming off via line 126. Further phosphoric acid is fed into the upper portion of scrubber 112 via lines 102 and 114. Water is fed into line 114 via line 116. The solution of the partially preneutralized phosphoric acid is fed from preneutralizer 100 via line 130 to rotary ammoniator-granulator 132. Further ammonia is fed via lines 108 and 134 into ammoniator-granulator 132, wherein the ammoniation is completed. Excess ammonia is required in ammoniator-granulator 132 to produce DAP. The granular product from ammoniator-granulator 132 is fed via line 136 into dryer 138. Exhaust containing ammonia and water vapor from ammoniator-granulator 132 is fed into the bottom of scrubber 112 via line 120. Water vapor comes off of scrubber 112 via line 1 18. The ammonia is scrubbed out of the off gases from ammoniator-granulator 132 and the phosphoric acid is fed from scrubber 112 via line 128 into the top of preneutralizer 100. (As an alternative, the granular material from dryer 138 can go directly to screen 146, with only the product size DAP going through cooler 142.) The dried granular DAP is fed via line 140 into cooler 142. The granular DAP is fed via line 144 into screen 146. The sized granular DAP product is removed via line 156 from screen 146. The undersized granular DAP exits screen 146 via line 152. The oversized granular DAP is removed from screen 146 and fed via line 148 into crusher 150. The crushed DAP exits from crusher 150 via line 154 and is mixed with the undersized granular DAP from line 152, to form a mixture of fines. The fines mixture is recycled via line 158 into the front end of ammoniator-granulator 132. Product size DAP can also be included in the recycle stream to aid in ammoniator-granulator operation.

Advantages can be taken of the maximum solubility of the ammonia/phosphoric acid mole ratio of about 1.45; therefore, the preneutralizer 100 is preferably operated at as near this point as is practical to obtain the most concentrated slurry having satisfactory fluidity. This slurry can either flow by gravity into a sawtooth weir pipe (not shown) for distribution in ammoniator-granulator 132, or be pumped into a sparged spray system (not shown) located over the moving bed (not shown) of dry recycle inside of ammoniator-granulator 132. The later procedure provides more consistent control and better slurry distribution. Ammoniation of the slurry in the ammoniator-granulator drum (not shown) to a mole ratio of about 2.0 lowers the solubility and causes crystallization of DAP. The heat of reaction between the monoammonium phosphate in the slurry and the ammonia causes the majority of the water present to vaporize and exit with the granulator off gases.

Broadly speaking, a preferred embodiment of the invention process involves treating solid DAP recycle (in a TVA type operation) with gaseous ammonia at elevated pressure to increase the ammoniacal nitrogen concentration. This recycle is then returned to the DAP granulator and incorporated into the final DAP product.

Preferably, one method of producing the triammonium phosphate or adsorbing the ammonia involves, first, introducing a portion of the DAP recycle material, normally present from the TVA process, into a vessel under vacuum, such that any air introduced with the recycle is removed. The DAP recycle material is then transferred to a second vessel in which there is an essentially 100 percent ammonia atmosphere at a pressure at or above 15 psia and a temperature sufficiently high to insure that the ammonia exists in the gaseous state. The DAP recycle material is kept in this second vessel, in contact with the ammonia atmosphere, for a period of time sufficient to allow the required amount of triammonium phosphate to be formed by chemical reaction, and/or the required amount of ammonia to be adsorbed. The DAP recycle material is then transferred to a third vessel where the excess ammonia is removed by vacuum, or vented to another part of the process, such as, the preneutralizer or scrubber. The ammonia-enriched DAP recycle is then transferred to the granulator where it is incorporated into the DAP product.

Preferably, another method for the production of triammonium phosphate and/or adsorption of ammonia is carried out in a single vessel as a batch process. In this case, the DAP recycle is placed in the vessel and the vessel is sealed. A vacuum is then applied to the vessel to remove the air. Anhydrous gaseous ammonia is then fed to the vessel until a pressure at or above 15 psia is obtained. The DAP recycle is then allowed to remain in the vessel, in contact with the ammonia, until the required amount of triammonium phosphate is formed and/or the required amount of ammonia is adsorbed. A vacuum is then applied to the vessel to remove the excess ammonia. The vessel is then opened and the ammonia-enriched DAP recycle is removed and transferred to the granulator where it is incorporated into the DAP product.

The particle size of the finely-divided DAP recycle is generally −9 mesh or less.

The ammonia gas pressure used is super atmospheric, with the ammonia gas pressure preferably being at least 15 psia and more preferably 30 to 95 psia.

The contact time of the pressurized gaseous ammonia with the DAP recycle should be sufficient to allow the required amount of triammonium phosphate to be formed by chemical reaction and/or the required amount of ammonia to be adsorbed. The contact time is generally between about 0.25 and about 90 minutes, preferably 5 to 60 minutes.

The initial moisture ($H_2O$) content of the DAP recycle is generally between about 0.2 to about 4 percent, preferably about 0.5 to 3.5 percent.

The temperature of the pressurized gaseous ammonia can be as low as 33° F., but is generally between about 45° and about 200° F.

The independent functions (variables) which provide increase in ammoniacal nitrogen concentration in the invention process can be represented with more particularity by the following regression equation:

% Nitrogen Increase=0.355×Initial % Moisture+0.0027×Contact Time (min.)+0.009×$NH_3$ Pressure (psia)−0.240 wherein the coefficients associated with the three independent functions (variables), i.e., the absolute ammonia pressure, the initial percent moisture and the contact time, can each vary plus or minus up to 50 percent (and still be within the scope of the regression equation). The dependent variable "% Nitrogen Increase" represents the increase of the ammoniacal nitrogen concentration. The coefficients in the above regression equation are based upon the combined data from Tables 6 and 10 below. As mentioned above, the coefficients of the above regression equation can each vary plus or minus 50 percent, but note that such coefficients may vary an even greater magnitude, and still be within the scope of the above regression equation, for wet process phosphoric acid with a significantly different combination of impurities.

Conducting the invention process according to the above regression formula provides DAP which has enhanced ammoniacal concentration and which is stable (i.e., as to the enhanced ammoniacal concentration), when recycled to the granulator and incorporated into the DAP product, upon aging.

The increase in the ammoniacal nitrogen concentration is also a function of the particle size of the granular DAP (recycle). Specifically, the smaller the particle size, the larger the increase in the percent nitrogen increase. The effect of the particle size is usually of small practical effect because the treated DAP (recycle) usually contains a relatively low amount of very small particles. The invention process includes treating recycle from a conventional TVA process which is composed of DAP dust, DAP undersized recycle material and crushed DAP oversize recycle material.

As used herein, all percentages are on a weight basis unless otherwise stated herein or obvious herefrom to one skilled in the art.

DAP is a product composed of ammonium phosphate, principally diammonium phosphate, resulting from the ammoniation of phosphoric acid. Diammonium phosphate is a chemical compound having the formula $(NH_4)_2HPO_4$.

The following examples serve to further illustrate the invention in greater detail.

In the following examples, the pressure ammoniation procedure of the (recycle) DAP was as follows:

(a) The weighed quantity of (recycle) DAP was placed in a pressure vessel, which was then sealed.

(b) A vacuum of 24 to 25" Hg was then applied to the sealed vessel to remove the air.

(c) Gaseous ammonia was added to the sealed vessel until the desired pressure was obtained.

(d) The (recycle) DAP was held in the sealed vessel for the required time, with additional ammonia being added to maintain the desired pressure (that is, to replace the ammonia consumed in the reaction).

(e) A vacuum of 24 to 25" Hg was again applied to the sealed vessel to remove the unreacted ammonia.

(f) Air was bled into the vessel to relieve the vacuum.

(g) A vacuum of 24 to 25" Hg was applied to the vessel again to help remove the last traces of ammonia.

(h) Air was bled into the vessel to relieve the vacuum.

(i) The vessel was opened and the ammoniated (recycle) DAP was removed and weighed.

EXAMPLE A

Small particles of (granular) DAP (produced by a conventional TVA process), comprising 17.82 percent nitrogen and 46.70 percent phosphate, having a N/P mole rate of 1.93:1 and having a particle size between −4 mesh and +14 mesh, were exposed to ammonia pressure of 15, 30 or 45 psia for 30, 45 or 60 minutes as set forth in Table 1 below. There were nine test samples. The above-described ammoniation procedure was used. Each of the nine DAP samples was separately placed in the pressure reactor and the pressure reactor was sealed. A vacuum was pulled on the sealed reactor to remove the air. The reactor was then filled with ammonia and pressurized to the desired test pressure. As necessary, additional ammonia was bled into the reactor to maintain the pressure. At the end of the specified contact time a vacuum was again applied to the reactor to remove the unreacted ammonia. Air was then bled into the reactor, the reactor was opened and the ammoniated DAP sample was removed. The results of these tests (high pressure ammonia treatment of DAP product) are set forth in Table 1 below. The results showed increases in the ammoniacal nitrogen concentration from 0.48 to 1.0 percent, that were generally proportional to the ammonia pressure and contact time.

TABLE 1

| Test Sample No. | Contact Time, min. | Ammonia Pressure, psia | N, % | $P_2O_5$, % | Molar Ratio | % N Increase |
|---|---|---|---|---|---|---|
| A-1 | 30 | 15 | 18.30 | 46.40 | 2.00 | 0.48 |
| A-2 | 45 | 15 | 18.30 | 46.51 | 1.99 | 0.48 |
| A-3 | 60 | 15 | 18.20 | 46.44 | 1.99 | 0.38 |
| A-4 | 30 | 30 | 18.36 | 46.41 | 2.00 | 0.54 |
| A-5 | 45 | 30 | 18.60 | 46.20 | 2.04 | 0.78 |
| A-6 | 60 | 30 | 18.47 | 46.09 | 2.03 | 0.65 |
| A-7 | 30 | 45 | 18.68 | 46.29 | 2.04 | 0.86 |
| A-8 | 45 | 45 | 18.82 | 46.09 | 2.07 | 1.00 |
| A-9 | 60 | 45 | 18.82 | 46.04 | 2.07 | 1.00 |

Test Sample Nos. A-2, A-5 and A-8, as well as a control, were aged for two weeks to determine if the nitrogen gains were stable. [The control was small particles of (granular) DAP which had not been ammoniated.] A portion of each of the samples and the control was aged in a sealed container; and a portion of each of the samples and the control was aged in an open pan. The results from these tests are set forth in Table 2:

TABLE 2

| Test Sample No. | Ammonia Pressure, psia | Sealed Container | | | | | Open Pan | | | | | Relative N Loss, % |
|---|---|---|---|---|---|---|---|---|---|---|---|---|
| | | N, % | $P_2O_5$, % | Vac. Oven Moist. | Dry Basis % N | Mole Ratio | N, % | $P_2O_5$, % | Vac. Oven Moist. | Dry Basis % N | Mole Ratio | |
| Control (Duplicate Analy.) | | 17.95 | 47.03 | 0.83 | 18.10 | 1.93 | 17.23 | 47.44 | 1.96 | 17.57 | 1.84 | 2.90 |
| | | | | | | | 17.68 | 47.34 | | 18.03 | 1.89 | 0.37 |
| A-2 | 15 | 18.32 | 46.6 | 0.45 | 18.40 | 1.99 | 16.98 | 44.83 | 6.80 | 18.22 | 1.92 | 1.00 |
| A-5 | 30 | 18.53 | 46.34 | 0.68 | 18.66 | 2.03 | 16.19 | 42.66 | 9.57 | 17.90 | 1.92 | 4.04 |
| (Duplicate Analy.) | | 18.43 | 46.28 | | 18.56 | 2.02 | | | | | | 3.52 |

TABLE 2-continued

| | | Sealed Container | | | | | Open Pan | | | | |
|---|---|---|---|---|---|---|---|---|---|---|---|
| Test Sample No. | Ammonia Pressure, psia | N, % | $P_2O_5$, % | Vac. Oven Moist. | Dry Basis % N | Mole Ratio | N, % | $P_2O_5$, % | Vac. Oven Moist. | Dry Basis % N | Mole Ratio | Relative N Loss, % |
|---|---|---|---|---|---|---|---|---|---|---|---|---|
| A-8 (Duplicate Analy.) | 45 | 19.02 | 46.02 | 1.43 | 19.30 | 2.09 | 16.27 | 42.09 | 10.78 | 18.24 | 1.96 | 5.49 |
| | | | | | | | 15.87 | 41.03 | | 17.79 | 1.96 | 7.82 |

Note: The relative nitrogen loss (percent) is based upon the dry basis percent nitrogen of the portion of the sample aged in the sealed container.

The results in Table 2 of the aging test showed significant moisture gains and nitrogen losses for all of the treated samples. Thus, simply reacting the DAP product with high pressure ammonia would not be practical since such treated product tended to lose the added nitrogen and to gain excessive moisture.

A particle size analysis for the starting DAP in this experiment was not run, however, since the starting DAP was obtained from a DAP production plant, a "typical" particle size distribution could be inferred. An example of a typical (30 day rolling average) particle size distribution is shown below:

| Tyler Sieve Size | 4 | 5 | 6 | 8 | 9 | 10 | 14 |
|---|---|---|---|---|---|---|---|
| Cumulative Percent Retained | 1.2 | 4.5 | 10.7 | 56.8 | 77.1 | 89.4 | 98.8 |
| Standard Deviation | 0.80 | 1.8 | 3.7 | 11.9 | 10.3 | 7.2 | 1.7 |

Also, it should be noted that this material was product size DAP, not recycle. The recycle consists of undersize material and crushed oversize with typically about 97 percent being smaller than 9 mesh.

EXAMPLE B

DAP dust, from the dryer in a conventional TVA process, was exposed to a 100 percent ammonia atmosphere at pressures from 15 psia to 90 psia. The DAP dust used in these tests was not mixed with any other DAP material. The size distribution of the DAP dust is shown below:

| Tyler Sieve Size | 24 | 42 | 60 | 100 | 200 |
|---|---|---|---|---|---|
| Micron Size | 707 | 354 | 250 | 149 | 74 |
| Cumulative Percent Retained | 1.56 | 37.31 | 53.40 | 60.72 | 74.96 |

The remaining portion of the dust (25.04 percent) passed through the 200 mesh sieve and was, thus, smaller than 74 microns. Contact times between the dust and the ammonia was 1 hour 40 minutes for test sample number B-1 and was 45 minutes for sample numbers B-2 to B-7. The results of these tests (DAP dust) are set forth in Table 3. The reasoning behind these tests was that the nitrogen enriched dust could be coated with slurry in the granulator and incorporated into the DAP product. The slurry was partially neutralized phosphoric acid, at a temperature of about 240° F., with an N/P mole ratio of about 1.4:1 to 1.6:1 and the following typical analysis: 43.4 percent $P_2O_5$, 13.5 percent N, 13.5 percent $H_2O$. The results of these tests showed nitrogen increases of 2.34 to 3.54 percent and nitrogen concentrations in the treated dust of 20.55 to 21.75 percent.

TABLE 3

| Test Sample No. | Starting % $P_2O_5$ | Starting % N | Starting Moisture, % | $NH_3$ Pressure, psia | Residence Time, min. | Final % $P_2O_5$ | Final % N | % N Increase |
|---|---|---|---|---|---|---|---|---|
| B-2 | 46.20 | 18.21 | 1.51 | 15 | 45 | 44.68 | 20.55 | 2.34 |
| B-3 | 46.20 | 18.21 | 1.51 | 30 | 45 | 44.21 | 21.18 | 2.97 |
| B-1 | 46.20 | 18.21 | 1.51 | 45 | 100 | 43.56 | 21.74 | 3.53 |
| B-7 | 46.20 | 18.21 | 1.51 | 45 | 45 | 44.04 | 20.96 | 2.75 |
| B-4 | 46.20 | 18.21 | 1.51 | 60 | 45 | 43.66 | 21.37 | 3.16 |
| B-5 | 46.20 | 18.21 | 1.51 | 75 | 45 | 42.76 | 21.08 | 2.87 |
| B-6 | 46.20 | 18.21 | 1.51 | 90 | 45 | 42.60 | 21.75 | 3.54 |

| Test Sample No. | Initial Weight, grams | Initial Grams N | Final Weight, grams | Weight Gain, grams | Calculated Grams N[(1)] | Final Grams N by Analysis | N Loss, grams | % N Loss Based On Weight Gain |
|---|---|---|---|---|---|---|---|---|
| B-2 | 20.58 | 3.75 | 21.42 | 0.84 | 4.44 | 4.40 | 0.04 | 4.97 |
| B-3 | 20.20 | 3.68 | 21.11 | 0.91 | 4.43 | 4.47 | −0.04 | |
| B-1 | 20.01 | 3.64 | 20.42 | 0.41 | 3.98 | 4.44 | −0.46 | |
| B-7 | 20.14 | 3.67 | 21.17 | 1.03 | 4.52 | 4.44 | 0.08 | 7.60 |
| B-4 | 20.30 | 3.70 | 21.49 | 1.19 | 4.68 | 4.59 | 0.09 | 7.56 |
| B-5 | 20.05 | 3.65 | 21.26 | 1.21 | 4.65 | 4.48 | 0.17 | 13.76 |
| B-6 | 20.19 | 3.68 | 21.52 | 1.33 | 4.78 | 4.68 | 0.10 | 7.16 |

Note:
[(1)] Initial Grams N plus Weight Gain × 14/17.

EXAMPLE C

A number of pressure ammoniation tests were run with DAP dust, which was from the dryer in a conventional TVA process, to determine the effect of contact time on nitrogen adsorption. Contact times from 0.25 to 30 minutes were investigated at ammonia pressures from 15 to 45 psia. The DAP dust in these tests were not mixed with any other DAP material. The dust had a particle size of −80 mesh. As with all of the tests in these examples, the air in the reactor was evacuated before pressurizing with ammonia. Moisture analyses were also run on all of the samples prior to the ammonia treatment. The results of this test series (DAP) are set forth in Table 4.

TABLE 4

| Test Sample No. | Contact Time, min. | $NH_3$ Pressure, psia | Initial % Moisture | Starting % $P_2O_5$ | Starting % N | Final % $P_2O_5$ | Final % N | % N Increase |
|---|---|---|---|---|---|---|---|---|
| C-1 | 30 | 45 | 2.16 | 45.76 | 17.07 | 42.62 | 21.23 | 4.16 |
| C-2 | 30 | 30 | 2.16 | 45.76 | 17.07 | 43.23 | 20.57 | 3.50 |
| C-3 | 20 | 45 | 2.16 | 45.76 | 17.07 | 43.37 | 20.41 | 3.34 |
| C-4 | 15 | 45 | 2.16 | 45.62 | 17.07 | 43.14 | 20.10 | 3.04 |
| C-5 | 45 | 45 | 1.98[2] | 45.54 | 17.59 | 43.99 | 20.54 | 2.95 |
| C-6 | 30 | 30 | 1.70[1] | 46.19 | 18.07 | 44.08 | 20.75 | 2.68 |
| C-7 | 20 | 30 | 2.16 | 45.62 | 16.99 | 43.67 | 19.66 | 2.68 |
| C-8 | 10 | 45 | 2.16 | 45.76 | 17.07 | 43.64 | 19.71 | 2.64 |
| C-9 | 20 | 30 | 1.70[1] | 46.19 | 18.07 | 44.31 | 20.40 | 2.33 |
| C-10 | 5 | 45 | 2.16 | 45.76 | 17.07 | 44.15 | 19.31 | 2.24 |
| C-11 | 30 | 15 | 2.16 | 45.76 | 17.07 | 44.00 | 19.24 | 2.17 |
| C-12 | 20 | 15 | 2.16 | 45.95 | 16.98 | 44.41 | 19.13 | 2.15 |
| C-13 | 10 | 30 | 2.16 | 45.76 | 17.07 | 44.26 | 19.22 | 2.15 |
| C-14 | 15 | 15 | 2.16 | 45.62 | 17.07 | 43.95 | 19.11 | 2.05 |
| C-15 | 10 | 30 | 1.70[1] | 46.19 | 18.07 | 44.77 | 20.08 | 2.01 |
| C-16 | 10 | 30 | 2.16 | 45.62 | 16.99 | 44.42 | 18.91 | 1.92 |
| C-17 | 10 | 15 | 2.16 | 45.95 | 16.98 | 44.65 | 18.64 | 1.66 |
| C-18 | 5 | 30 | 2.16 | 45.62 | 16.99 | 44.70 | 16.58 | 1.60 |
| C-19 | 1 | 30 | 2.16 | 46.33 | 17.17 | 45.04 | 18.75 | 1.58 |
| C-20 | 2 | 45 | 2.16 | 45.76 | 17.07 | 44.77 | 18.63 | 1.56 |
| C-21 | 1 | 45 | 2.16 | 46.26 | 17.35 | 44.73 | 18.89 | 1.54 |
| C-22 | 2 | 30 | 2.16 | 45.26 | 16.99 | 44.66 | 18.51 | 1.53 |
| C-23 | 0.75 | 30 | 2.16 | 46.33 | 17.17 | 45.43 | 18.67 | 1.50 |
| C-24 | 10 | 15 | 2.16 | 45.62 | 16.99 | 44.71 | 18.46 | 1.48 |
| C-25 | 5 | 30 | 1.70[1] | 46.19 | 18.07 | 45.27 | 19.48 | 1.41 |
| C-26 | 0.75 | 45 | 2.16 | 46.33 | 17.17 | 45.37 | 18.54 | 1.37 |
| C-27 | 20 | 30 | 0.70 | 45.92 | 17.98 | 45.05 | 19.30 | 1.32 |
| C-28 | 0.25 | 30 | 2.16 | 46.33 | 17.17 | 45.55 | 18.48 | 1.31 |
| C-29 | 1 | 45 | 2.16 | 46.33 | 17.17 | 45.40 | 18.42 | 1.25 |
| C-30 | 0.5 | 30 | 2.16 | 46.33 | 17.17 | 45.37 | 18.39 | 1.22 |
| C-31 | 0.5 | 45 | 2.16 | 46.33 | 17.17 | 45.54 | 18.38 | 1.21 |
| C-32 | 0.25 | 45 | 2.16 | 46.33 | 17.17 | 45.74 | 18.32 | 1.15 |
| C-33 | 1 | 45 | 2.16 | 46.26 | 17.35 | 45.88 | 18.41 | 1.06 |
| C-34 | 20 | 30 | 0.78 | 46.52 | 18.21 | 46.01 | 19.26 | 1.05 |
| C-35 | 5 | 15 | 2.16 | 45.95 | 16.98 | 45.27 | 18.01 | 1.03 |
| C-36 | 30 | 30 | 0.73 | 46.47 | 18.29 | 45.77 | 19.27 | 0.98 |
| C-37 | 20 | 30 | 0.87 | 46.88 | 18.43 | 45.93 | 19.40 | 0.97 |
| C-38 | 15 | 30 | 0.70 | 45.92 | 17.98 | 44.74 | 18.94 | 0.95 |
| C-39 | 2 | 30 | 2.16 | 45.76 | 17.07 | 44.98 | 17.95 | 0.88 |
| C-40 | 15 | 30 | 0.78 | 46.52 | 18.21 | 46.11 | 19.07 | 0.86 |
| C-41 | 10 | 30 | 0.78 | 46.52 | 18.21 | 45.97 | 19.00 | 0.79 |
| C-42 | 20 | 30 | 0.70 | 46.01 | 18.04 | 45.15 | 18.76 | 0.73 |
| C-43 | 10 | 30 | 0.73 | 46.47 | 18.29 | 46.08 | 19.00 | 0.72 |
| C-44 | 15 | 30 | 0.87 | 46.88 | 18.43 | 45.82 | 19.14 | 0.71 |
| C-45 | 20 | 30 | 0.73 | 46.47 | 18.29 | 45.85 | 19.98 | 0.69 |
| C-46 | 15 | 30 | 0.70 | 46.01 | 18.04 | 45.43 | 18.72 | 0.68 |
| C-47 | 5 | 30 | 0.78 | 46.52 | 18.21 | 46.40 | 18.85 | 0.64 |
| C-48 | 2 | 15 | 2.16 | 45.95 | 16.98 | 45.63 | 17.62 | 0.64 |
| C-49 | 5 | 30 | 0.73 | 46.47 | 18.29 | 46.23 | 18.92 | 0.64 |
| C-50 | 10 | 30 | 0.87 | 46.88 | 18.43 | 46.16 | 19.06 | 0.63 |
| C-51 | 10 | 30 | 0.70 | 46.01 | 18.04 | 45.66 | 18.63 | 0.59 |
| C-52 | 0.75 | 15 | 2.16 | 46.33 | 17.17 | 45.25 | 17.76 | 0.59 |
| C-53 | 5 | 30 | 0.87 | 46.88 | 18.43 | 46.58 | 19.01 | 0.58 |
| C-54 | 0.25 | 15 | 2.16 | 46.33 | 17.17 | 45.40 | 17.74 | 0.57 |
| C-55 | 5 | 30 | 0.70 | 46.01 | 18.04 | 45.91 | 18.60 | 0.57 |
| C-56 | 0.5 | 15 | 2.16 | 46.33 | 17.17 | 45.44 | 17.66 | 0.49 |
| C-57 | 1 | 15 | 2.16 | 46.33 | 17.17 | 45.27 | 17.63 | 0.46 |

Notes:

(1) Sample Nos. C-6, C-9, C-15 and C-25 each had sufficient water added to reach the initial percent moisture indicated.

(2) Sample No. C-5 was a mixture of dust samples and was humidified to reach the initial percent moisture indicated.

The results from these tests indicate that nitrogen adsorption is a function of ammonia pressure, contact time and initial moisture. [This conclusion was based upon statistical analysis which provided a regression equation that the percent nitrogen increase for the DAP was a function of the (absolute) ammonia pressure, the ammonia contact time and the initial dust moisture.]

EXAMPLE D

This example illustrated the results of pressure ammoniation tests run with DAP recycle material from a conventional TVA process. The DAP recycle material comprises a combination of dust, undersize particles (−9 mesh) and crushed oversize particles. Where samples of actual recycle going to the granulator could not be collected, separate samples (D-I and D-II) of the three-size fractions were collected and blended. The blending ratio in these samples (D-I and D-II) was one part of dust, three parts of crushed oversize particles and parts of undersize particles. For sample D-III, the actual recycle going to the granulator was used. However, for all experiments, the actual recycle or simulated recycle was screened on a 9 mesh screen; and any oversize particles which did not pass through the screen were ground (to pass the 9 mesh screen) and combined with the original sample.

The recycle screen analysis for samples D-I, D-II and D-III are set forth in Table 5.

TABLE 5

| Sieve (Tyler) | Micron | D-I % Retained | D-II % Retained | D-III % Retained |
|---|---|---|---|---|
| 7 | 2830 | 0 | 0 | 0 |
| 9 | 2000 | 2.43 | 2.13 | 1.58 |
| 12 | 1410 | 31.20 | 27.32 | 20.30 |
| 16 | 1000 | 13.30 | 11.65 | 8.65 |
| 24 | 707 | 21.50 | 18.83 | 13.99 |
| 35 | 420 | 11.00 | 9.63 | 7.16 |
| 48 | 297 | 4.90 | 4.29 | 3.19 |
| 60 | 250 | 3.00 | 2.63 | 1.95 |
| 80 | 177 | 0.10 | 0.09 | 0.07 |
| 100 | 149 | 1.80 | 1.58 | 1.17 |
| 170 | 88 | 6.00 | 5.25 | 3.90 |
| 250 | 63 | 2.36 | 2.07 | 1.54 |
| 325 | 44 | 1.60 | 1.40 | 1.04 |
| Pan | −44 | 1.00[1] | 0.88[1] | 0.65[1] |

Note: 1. Percent passing through 325 mesh sieve.

Samples D-I, D-II and D-III were subject to ammonia pressures from 30 psia to 85 psia for a time period of 5 minutes to 90 minutes. The results of the recycle ammoniation tests are set forth in Table 6.

TABLE 6

| Test Sample No. | Initial % $P_2O_5$ | Initial % N | Initial % Moisture | Contact Time, min. | Ammonia Pressure, psia | Final % $P_2O_5$ | Final % N | Ammonia Circulation | % N Increase |
|---|---|---|---|---|---|---|---|---|---|
| D-I | 45.46 | 17.87 | 1.67 | 5 | 30 | 45.38 | 18.27 | No | 0.41 |
| D-I | 45.46 | 17.87 | 1.67 | 10 | 30 | 45.24 | 18.43 | No | 0.57 |
| D-I | 45.46 | 17.87 | 1.67 | 15 | 30 | 45.28 | 18.59 | No | 0.73 |
| D-I | 45.46 | 17.87 | 1.67 | 20 | 30 | 45.00 | 18.57 | No | 0.71 |
| D-I | 45.40 | 17.83 | 1.67 | 10 | 45 | 45.04 | 18.97 | No | 1.14 |
| D-I | 45.40 | 17.83 | 1.67 | 15 | 45 | 45.07 | 18.82 | No | 0.99 |
| D-I | 45.40 | 17.83 | 1.67 | 20 | 45 | 44.76 | 18.64 | No | 0.81 |
| D-I | 45.40 | 17.83 | 1.67 | 30 | 45 | 44.20 | 19.37 | No | 1.54 |
| D-I | 45.92 | 18.03 | 1.73 | 45 | 75 | 45.13 | 19.38 | ? | 1.35 |
| D-I | 45.92 | 18.03 | 1.73 | 45 | 75 | 44.85 | 19.93 | Partial | 1.90 |
| D-I | 45.92 | 18.03 | 1.73 | 45 | 60 | 44.83 | 19.91 | No | 1.88 |
| D-I | 46.01 | 17.98 | 1.73 | 45 | 60 | 44.84 | 20.36 | Yes | 2.38 |
| D-I | 45.62 | 17.47 | 1.94 | 45 | 60 | 44.26 | 20.29 | Yes | 2.82 |
| D-II | 45.62 | 17.47 | 1.94 | 90 | 60 | 43.32 | 20.78 | Yes | 3.31 |
| D-II | 45.62 | 17.47 | 1.94 | 90 | 75 | 43.86 | 20.55 | No | 3.08 |
| D-II | 45.62 | 17.47 | 1.94 | 45 | 75 | 43.87 | 20.41 | No | 2.94 |
| D-III | 46.22 | 17.62 | 2.13 | 60 | 75 | 44.24 | 20.48 | No | 2.86 |
| D-III | 46.22 | 17.62 | 2.13 | 60 | 60 | 44.47 | 20.47 | No | 2.85 |
| D-III | 46.22 | 17.62 | 2.13 | 30 | 75 | 44.58 | 20.10 | No | 2.48 |
| D-III | 46.22 | 17.62 | 2.13 | 30 | 60 | 44.98 | 19.78 | Yes | 2.16 |
| D-III | 46.22 | 17.62 | 2.13 | 90 | 45 | 44.40 | 20.65 | Yes | 3.03 |
| D-III | 46.22 | 17.62 | 2.13 | 60 | 45 | 44.53 | 20.40 | Yes | 2.78 |
| D-III | 46.22 | 17.62 | 2.13 | 45 | 45 | 44.87 | 19.87 | Yes | 2.25 |
| D-III | 46.22 | 17.62 | 2.13 | 30 | 45 | 44.93 | 20.02 | Yes | 2.40 |
| D-III | 46.22 | 17.62 | 2.13 | 60 | 75 | 44.61 | 20.33 | No | 2.71 |

Using the results of the recycle ammoniation tests, a linear regression equation can be developed to predict the percent ammoniacal nitrogen increase as a function of the (absolute) ammonia pressure, the contact time and the starting recycle moisture. The predictions of the linear regression equation can then be incorporated into a mathematical mass balance model of the reactor and granulator portions of a conventional TVA DAP plant to calculate the conditions necessary to produce 1846-0 DAP using the starting recycle ammoniacal nitrogen and $P_2O_5$ concentrations.

[The mass balance model is designed to calculate equilibrium conditions (mainly product weight, product $P_2O_5$ concentration and product ammoniacal nitrogen concentration) in a DAP plant when a change is made in one or more of the process variables (i.e., starting conditions) and consists of a series of mathematical equations in a Microsoft® Excel® spreadsheet. The starting conditions are entered by the user in a group of cells at the top of the spreadsheet. These include initial recycle weight, the percent recycle ammoniated (in the pressure reactor), the recycle to product ratio, the slurry mole ratio, the granulator/slurry mole ratio (i.e., the moles of ammoniacal nitrogen fed to the reactor plus the moles of ammoniacal nitrogen fed to the granulator divided by the moles of phosphorus in the phosphoric acid), the ammonia pressure in the pressure reactor, the residence (contact) time of the pressure reactor, the pressure reactor efficiency (normally 100 percent), the percent moisture in the product leaving the dryer, the regression equation coefficients for the pressure reactor (i.e., contact time, ammonia pressure and moisture) and the phosphoric acid feed rate (weight/unit time) and $P_2O_5$ concentration fed to the plant. Below the starting conditions are a series of rows where masses (weights) and concentrations are calculated for various parts of the plant. Each row terminates with values for the product weight, the $P_2O_5$ concentration of the DAP product and the nitrogen concentration of the product. The first row uses only the starting conditions for the product calculations. The second row then uses the values calculated in the first row to calculate a new value for the product weight, the $P_2O_5$ concentration of the DAP product and the nitrogen concentration of the product. The third row uses the values from the second row and so on down the spreadsheet. Each row represents one pass of the recycle material through the plant and can be related to the time required for the recycle to go through the plant (i.e., the recycle residence time). Eventually (typically between rows 20 to 30), the calculated values for the product become essentially constant, indicating that the plant has reached equilibrium. If the product composition is acceptable at this point, the model run is finished. Otherwise one or more of the starting conditions can be adjusted and the model run again. Thus, the model can be used to predict the effect of treating a portion of the recycle with high pressure ammonia.]

Treating DAP recycle with high pressure ammonia is a practical method of producing DAP without the use of nitrogen supplements.

Figure 2:
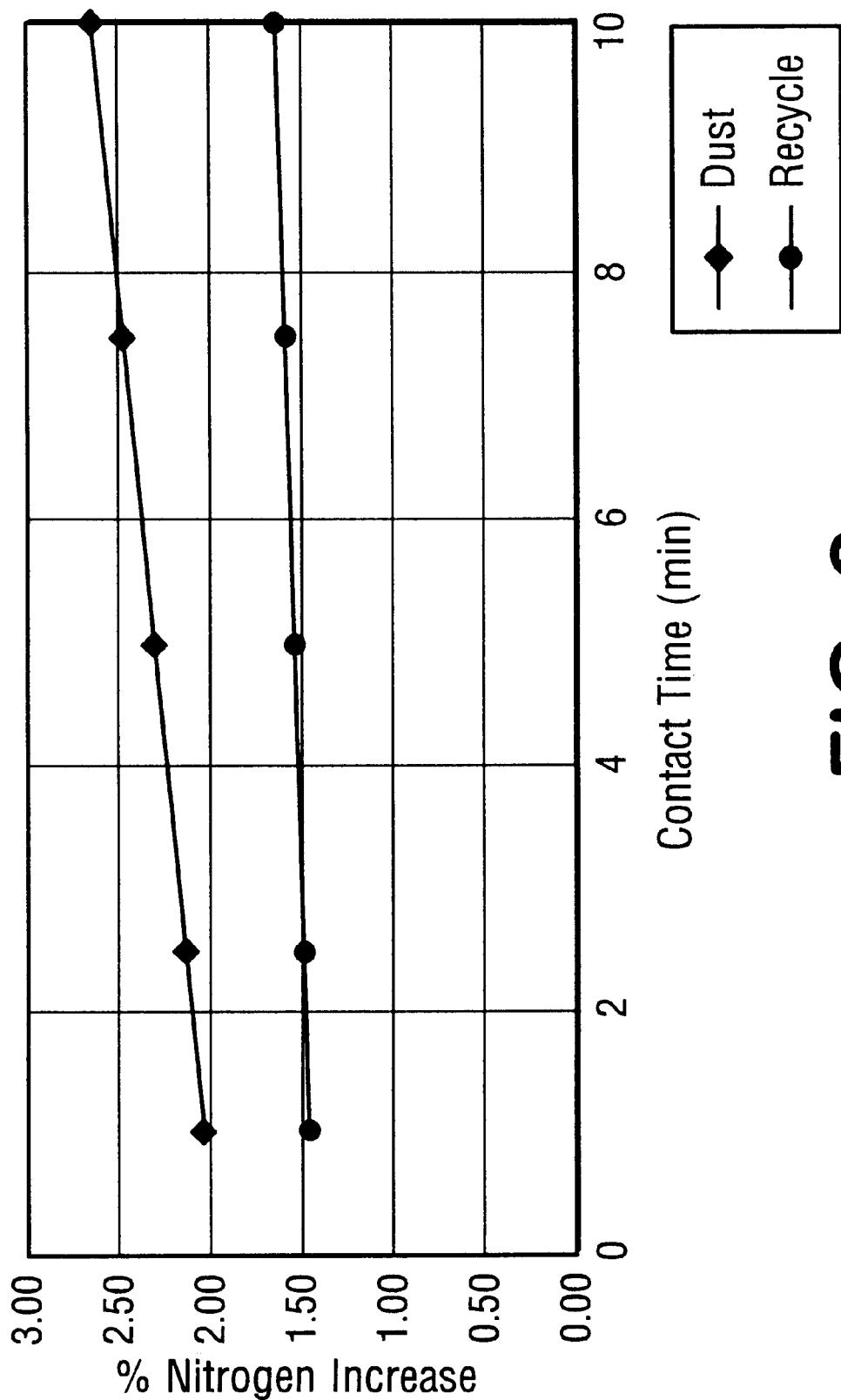
FIG. 2 is a graph of contact time versus percent nitrogen increase for DAP dust and recycle.

The results from Table 6 indicate that, in general, the recycle DAP did not absorb as much ammonia as did dust at similar conditions of ammonia pressure, contact time and initial moisture. FIG. 2 shows a comparison of the nitrogen adsorption for the DAP recycle and the DAP dust (Example C).

An attempt was also made to determine the effect of circulating the ammonia during the test. In this case, due to equipment limitations, the results were inconclusive. Since the initial moisture appeared to have a strong effect on the quantity of nitrogen adsorbed, several tests were run at the end of this series in which additional moisture was added to starting recycle. These tests showed fairly high increases in the nitrogen concentration at contact times of 5 to 7 minutes, with the temperatures inside of the reactor in the range of 217° to 218° F. Since condensate was also observed in the vacuum line used to evacuate the ammonia from the reactor after the test, this suggests that some of the added water was vaporized during the reaction and did not remain with the DAP recycle. Unfortunately, since the available moisture determination methods cannot distinguish between moisture loss and ammonia loss, accurate moisture analyses of the ammoniated recycle samples could not be obtained.

EXAMPLE E

To determine how the ammonia-fortified DAP recycle behaves when incorporated into granular DAP product, a series of small scale batch granulation tests were conducted. Since it was impractical to spray preneutralizer slurry onto the recycle granular DAP in the ammoniator granulator, as would be done in the conventional TVA process, preneutralizer slurry obtained from a commercial scale DAP plant using the conventional TVA process was blended with granular DAP recycle in a dough mixed and then rapidly transferred to a bench scale ammoniator granulator. The bench scale ammoniator granulator had a cylinder (14 inches diameter×8 inches long) mounted on its side and attached to a motor with a chain drive such that it could be rotated. A variable speed motor was provided to adjust the rotation speed. A removable hatch was provided on the circumference of the cylinder through which material could be added or removed. A pipe (the ammonia sparger) entered the drum at one end through a seal and was routed to and across the bottom of the cylinder (offset ~15° in the direction of rotation). The pipe was fixed in the cylinder and did not rotate with the cylinder. The portion of the pipe extending across the bottom of the cylinder was perforated to provide even distribution of the ammonia. The opposite end of the drum contained two ports. One port was used for a thermocouple and the other port was used as an exhaust port. In these tests weighted portions of DAP recycle and hot (~240° F.) partially ammoniated phosphoric acid slurry were blended in the dough mixer and then placed in the rotating drum where ammonia was sparged into the blend. After removal from the drum (granulator) the product was dried in a laboratory oven at 225° F. for (typically) 30 minutes. To provide a basis for comparison, some of the tests were run with normal (untreated) DAP recycle, while other tests were run with ammonia-fortified DAP recycle.

Tests E-3, E-4, E-8 and E-9 were run with untreated, normal, (plant) DAP recycle as controls and to provide a basis for comparison with granulation tests conducted with ammonia-treated DAP recycle. Tests E-5, E-6 and E-7 were conducted with DAP recycle which had been treated with 60 psia ammonia for 45 minutes (using the pressure ammoniation procedure described above). Test E-10 was conducted with DAP recycle which had been treated with 60 psia ammonia for 90 minutes (using the pressure ammoniation procedure described above). Test E-11 was conducted with DAP recycle (using the pressure ammoniation procedure described above) that had been treated with 75 psia ammonia for 30 minutes. The results of granulation tests E-3 to E-11 are set forth in Table 7.

TABLE 7

| Test<br>Recycle Type | E-3<br>Plant | E-4<br>Plant | E-5<br>Treated | E-6<br>Treated | E-7<br>Treated |
|---|---|---|---|---|---|
| Recycle Analysis | | | | | |
| % $P_2O_5$ | 46.28 | 45.63 | 45.13 | 45.13 | 44.85 |
| % N | 18.02 | 18.02 | 19.38 | 19.38 | 19.93 |
| % $H_2O$ | 2.12 | 2.22 | 1.44 | .44 | 1.44 |
| Slurry Analysis | | | | | |
| % $P_2O_5$ | 42.36 | 43.70 | 43.53 | 43.53 | 43.93 |
| % N | 12.99 | 13.28 | 13.29 | 13.27 | 13.24 |
| % $H_2O$ | 13.24 | 10.38 | 11.70 | 11.70 | 11.54 |
| Dried Product Analysis | | | | | |
| % $P_2O_5$ | 46.98 | 46.89 | 47.48 | 46.02 | 45.13 |
| % N | 18.41 | 17.86 | 18.48 | 18.61 | 18.40 |
| % $H_2O$ | 0.39 | 0.75 | 0.23[1] | 1.80 | 2.90 |
| Overall Mass Balance, % | | | | | |
| $P_2O_5$ | 102.89 | N/A | 101.77 | 99.44 | 100.08 |
| N | 97.50 | N/A | 96.75 | 103.23 | 98.60 |
| % N Loss-Granulator | 1.44 | N/A | -2.27 | -3.04 | 0.36 |
| % N Loss Dryer | 1.07 | 2.97 | 5.40 | -0.18 | 1.04 |

| Test<br>Recycle Type | E-8<br>Plant | E-9<br>Plant | E-10<br>Treated | E-11<br>Treated |
|---|---|---|---|---|
| Recycle Analysis | | | | |
| % $P_2O_5$ | 45.62 | 45.53 | 43.32 | 45.11 |
| % N | 17.47 | 17.27 | 20.78 | 20.06 |
| % $H_2O$ | 1.29 | 1.48 | 1.94 | 2.59 |
| | | (2) | | (4) |
| Slurry Analysis | | | | |
| % $P_2O_5$ | 44.38 | 50.61 | 45.13 | 49.49 |
| % N | 14.08 | 7.31 | 14.08 | 11.94 |
| % $H_2O$ | 7.04 | N/A | 8.43 | 0.99 |
| | | | (3) | |
| Dried Product Analysis | | | | |
| % $P_2O_5$ | 45.74 | 47.04 | 46.79 | 47.27 |
| % N | 17.71 | 17.81 | 17.33 | 19.17 |
| % $H_2O$ | 1.05 | 1.16 | 2.46 | 0.99 |
| Overall Mass Balance, % | | | | |
| $P_2O_5$ | 100.98 | 107.48 | 101.73 | 101.12 |
| N | 98.12 | 94.84 | 96.13 | 99.76 |
| % N Loss-Granulator | 1.60 | 6.57 | 2.69 | -0.11 |
| % N Loss Dryer | 0.29 | -1.51 | 1.21 | 0.35 |

Notes:

(1) Dried 2 hours at 232° F.

(2) Slurry augmented with 54 percent phosphoric acid.

(3) Ammonia supply to granulator exhausted before required quantity added.

(4) Laboratory produced slurry using clarified phosphoric acid.

EXAMPLE F

Figure 3:
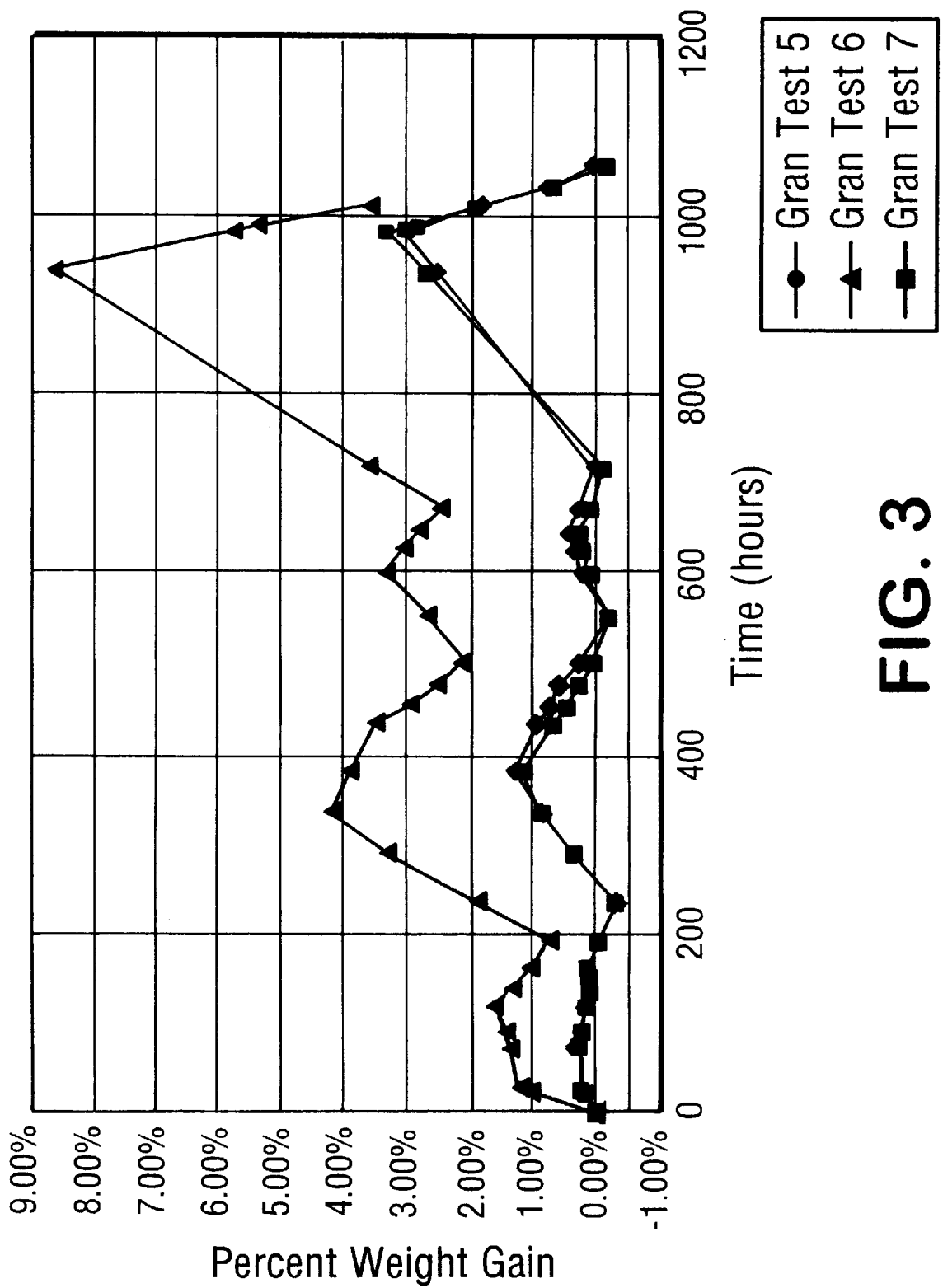
FIG. 3 is a graph of weight changes of a DAP aging test.

Product size (−4, +14 mesh) DAP samples from three of the granulation tests of Example E, were subjected to a six-week aging test. Two of the granulation samples, i.e., E-5 and E-7 N-fortified recycle, were made with ammonia-fortified ammonium phosphate recycle. The third granulation sample, i.e., E-8 plant recycle, was made from the unfortified plant DAP recycle. The aging test involved placing a known weight of each sample in a pan and placing the pans in a non-climate controlled area (i.e., covered to exclude rain, but otherwise subject to normal outside variations of temperature and humidity). The sample weights were then determined periodically and samples collected for analysis after 2 weeks, 4 weeks and 6 weeks. A portion of each sample was also aged in a closed container and sampled at the same time as the pan samples for comparison. All three samples (open pans) tended to gain and lose weight as a function of prevailing weather conditions (i.e., they gained weight after heavy rains and lost weight during dry periods). However, test sample number F-5 showed the greatest weight variation. FIG. 3 shows the weight changes for the three samples. Both of the samples in the closed containers and the samples in the open pans lost ammonia during the six weeks. No pattern to the ammonia losses, however, was observed. At the end of the tests, the greatest ammonia loss was from the open pan containing one of the samples made with the ammonia fortified recycle material. However, the open pan containing the other sample made with ammonia fortified recycle had the lowest ammonia loss of the exposed samples. The open pan containing the sample made with plant recycle showed an ammonia loss between the other two test samples. Thus, the DAP made with ammonia fortified recycle did not show any significant difference in aging behavior from the DAP made with normal recycle. Table 8 shows the ammonia analyses (expressed as dry basis to account for changes in moisture) from the aging test. The results indicate that treating DAP recycle with high pressure ammonia is a practical method of producing DAP having an enhanced ammoniacal nitrogen concentration.

TABLE 8

| | Granulation Test<br>Sample F-5<br>N Fortified Recycle | Granulation Test<br>Sample F-7<br>N Fortified Recycle | Granulation Test F-8<br>Plant Recycle |
|---|---|---|---|
| Initial % N | 18.85 | 18.92 | 17.90 |
| 2 Weeks - Aging | | | |
| % N Sealed Sample | 18.61 | 18.67 | 17.34 |
| % N Pile Sample | 18.56 | 18.36 | 17.62 |
| % N Loss Sealed Sample | 0.24 | 0.25 | 0.56 |
| % N Loss Pile Sample | 0.29 | 0.56 | 0.28 |
| 4 Weeks - Aging | | | |
| % N Sealed Sample | 18.43 | 18.79 | 17.64 |
| % N Pile Sample | 18.46 | 18.72 | 17.79 |
| % N Loss Sealed Sample | 0.42 | 0.13 | 0.26 |
| % N Loss Pile Sample | 0.39 | 0.20 | 0.11 |
| 6 Weeks - Aging | | | |
| % N Sealed Sample | 18.41 | 18.52 | 17.21 |

TABLE 8-continued

|  | Granulation Test Sample F-5 N Fortified Recycle | Granulation Test Sample F-7 N Fortified Recycle | Granulation Test F-8 Plant Recycle |
|---|---|---|---|
| % N Pile Sample | 18.10 | 18.45 | 17.27 |
| % N Loss Sealed Sample | 0.44 | 0.40 | 0.69 |
| % N Loss Pile Sample | 0.75 | 0.47 | 0.63 |

EXAMPLE G

The effect of particle size on ammonia adsorption into DAP recycle was determined by separating samples of DAP into four discrete size fractions, that is, −10, +20 mesh, −20, +48 mesh, −48, +80 mesh and −80 mesh. Each size fraction of each test sample was then treated with ammonia at elevated pressure (using the pressure ammoniation procedure described above). The weighted quantity of recycle was placed in a pressure vessel and sealed. A vacuum of 24 to 25 inches mercury was then applied to the vessel to remove the air. Gaseous ammonia was added to the vessel until the desired pressure was obtained. The recycle was kept in the vessel for the required time with additional ammonia added as needed to maintain the desired pressure. After the set time, a vacuum of 24 to 25 inches mercury was again applied to the vessel to remove any unreacted ammonia. Air was bled into the reactor. Once again, a vacuum was applied to remove any residual trace of ammonia. Air was then bled into the vessel. The vessel was opened and the recycle is removed and weighed.

In this experiment, all of the samples were collected from operating (commercial scale) DAP plants. The sample labeled "DAP1 Recycle Batch 2" was collected from a chute feeding the bottom of the recycle elevator (that feeds the ammoniator-granulator) at a first DAP plant and contains undersize material and crushed oversize material from the plant screening circuit (at whatever proportions they happened to be running in the plant that day). The sample labeled "DAP1 Recycle" was collected at the same location (as the "DAP1 Recycle Batch 2" sample). The sample labeled "DAP 2W Recycle" was collected from a chute feeding the bottom of the recycle elevator on the west side of a second DAP plant (this plant has two mirror image DAP trains; East and West) and contains a similar mixture of undersize and crushed oversize material from the plant screening circuit. The sample labeled "DAP1 Gran Feed (Recycle)" was collected from the chute at the top of the recycle elevator that goes directly to the ammoniator-granulator in the first DAP plant and contains the same mixture of undersize and crushed oversize. The screen size distributions of the various samples when they were collected are shown below:

| Screen Size | DAP1 Recycle Batch 2 | DAP1 Recycle | DAP2W Recycle | DAP1 Gran Feed (Recycle) |
|---|---|---|---|---|
| −10, +20 | 61.38% | 65.36% | 91.46% | 66.31% |
| −20, +48 | 27.70% | 24.02% | 7.87% | 19.08% |
| −48, +80 | 5.48% | 7.17% | 0.32% | 6.46% |
| −80 | 5.44% | 3.44% | 0.35% | 8.15% |

Figure 4:
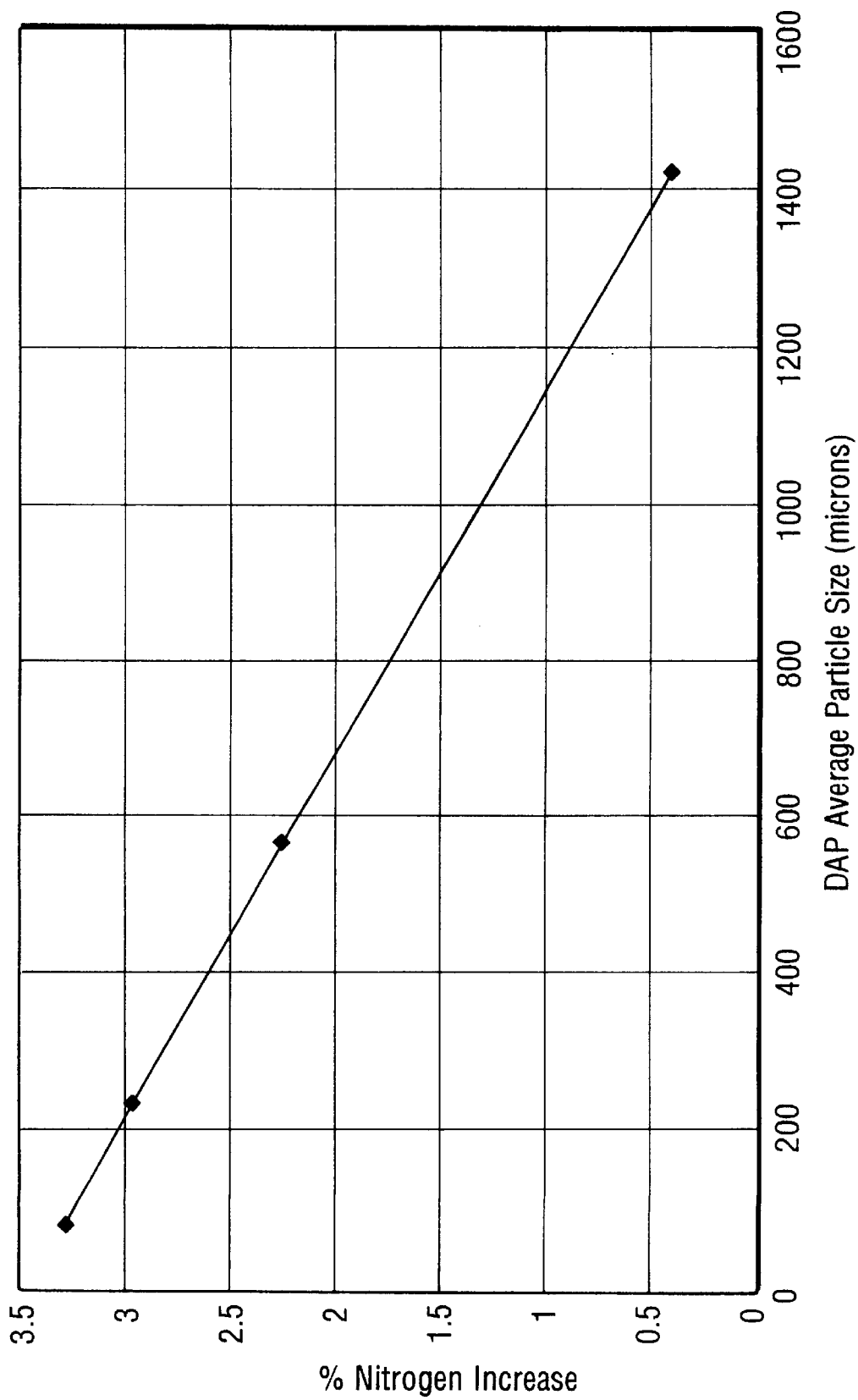
FIG. 4 is a graph of percent nitrogen increase versus DAP particle size.

The results from this experiment are set forth in Table 9. As seen from the data, the largest size fraction (−10, +20 mesh) shows a significantly lower nitrogen increase than the other size particles. For −20 mesh size fractions and small size fractions, the percent nitrogen increase generally increased with decreasing particle size. In these samples, the moisture concentrations of the samples were similar and the ammonia pressures were not vastly different. Therefore, the only statistically significant variables were particle size and contact time. FIG. 4 shows a plot of the percent nitrogen increase as a function of particle size for a contact time of ten minutes.

TABLE 9

| Initial Sample Source | Sieve Size (U.S. Std. Mesh) | Average Particle Size (microns) | $NH_3$ Pressure (PSIA) | Contact Time (min.) | Initial % $P_2O_5$ | Initial % N | Initial % $H_2O$ | Final % $P_2O_5$ | Final % N | % N Increase |
|---|---|---|---|---|---|---|---|---|---|---|
| DAP1 Recycle Batch 2 | −10:+20 | 1420.5 | 60 | 10 | 46.06 | 17.32 | 1.65 | 45.75 | 17.97 | 0.65 |
| DAP1 Recycle Batch 2 | −20:+48 | 569 | 60 | 10 | 45.70 | 17.47 | 2.22 | 43.96 | 20.37 | 2.90 |
| DAP1 Recycle Batch 2 | −48:+80 | 237 | 60 | 10 | 45.72 | 17.43 | 2.40 | 43.70 | 20.76 | 3.33 |
| DAP1 Recycle Batch 2 | −80 | 88.5 | 60 | 10 | 46.09 | 17.39 | 2.21 | 43.75 | 20.60 | 3.22 |
| DAP1 Recycle Batch 2 | −10:+20 | 1420.5 | 60 | 5 | 46.05 | 17.36 | 1.65 | 45.80 | 17.56 | 0.20 |
| DAP1 Recycle Batch 2 | −20:+48 | 569 | 60 | 5 | 46.07 | 17.40 | 2.22 | 45.23 | 18.36 | 0.96 |
| DAP1 Recycle Batch 2 | −48:+80 | 237 | 60 | 5 | 45.70 | 17.36 | 2.40 | 44.22 | 19.80 | 2.44 |
| DAP1 Recycle Batch 2 | −80 | 88.5 | 60 | 5 | 45.82 | 17.30 | 2.21 | 44.12 | 19.95 | 2.65 |
| DAP1 Recycle Batch 2 | −10:+20 | 1420.5 | 60 | 20 | 46.61 | 17.25 | 1.65 | 45.94 | 18.13 | 0.88 |
| DAP1 Recycle Batch 2 | −20:+48 | 569 | 60 | 20 | 46.37 | 17.41 | 2.22 | 43.92 | 21.07 | 3.66 |
| DAP1 Recycle Batch 2 | −48:+80 | 237 | 60 | 20 | 46.27 | 17.41 | 2.40 | 43.08 | 21.93 | 4.52 |
| DAP1 Recycle Batch 2 | −80 | 88.5 | 60 | 20 | 46.53 | 17.47 | 2.21 | 43.88 | 21.13 | 3.66 |
| DAP1 Recycle | −10:+20 | 1420.5 | 60 | 10 | 46.95 | 17.25 | 1.97 | 46.70 | 17.49 | 0.24 |
| DAP1 Recycle | −20:+48 | 569 | 60 | 10 | 46.62 | 17.25 | 2.16 | 45.83 | 18.57 | 1.32 |
| DAP1 Recycle | −48:+80 | 237 | 60 | 10 | 46.94 | 17.23 | 2.25 | 44.18 | 20.62 | 3.39 |
| DAP1 Recycle | −80 | 88.5 | 60 | 10 | 47.09 | 17.30 | 2.12 | 44.52 | 20.56 | 3.26 |
| DAP1 Recycle | −10:+20 | 1420.5 | 60 | 20 | 46.95 | 17.25 | 1.97 | 46.19 | 18.07 | 0.82 |
| DAP1 Recycle | −20:+48 | 569 | 60 | 20 | 46.62 | 17.25 | 2.16 | 44.07 | 20.75 | 3.50 |
| DAP1 Recycle | −48:+80 | 237 | 60 | 20 | 46.94 | 17.23 | 2.25 | 43.06 | 22.27 | 5.04 |

TABLE 9-continued

| Initial Sample Source | Sieve Size (U.S. Std. Mesh) | Average Particle Size (microns) | $NH_3$ Pressure (PSIA) | Contact Time (min.) | Initial % $P_2O_5$ | Initial % N | Initial % $H_2O$ | Final % $P_2O_5$ | Final % N | % N Increase |
|---|---|---|---|---|---|---|---|---|---|---|
| DAP1 Recycle | −80 | 88.5 | 60 | 20 | 47.09 | 17.30 | 2.12 | 43.94 | 21.12 | 3.82 |
| DAP 2W Recycle | −10:+20 | 1420.5 | 60 | 10 | 46.30 | 17.69 | 2.27 | 45.86 | 18.22 | 0.53 |
| DAP 2W Recycle | −20:+48 | 569 | 60 | 10 | 46.38 | 17.60 | 2.54 | 44.76 | 19.52 | 1.92 |
| DAP 2W Recycle | −48:+80 | 237 | 60 | 10 | 46.00 | 17.68 | 2.64 | 44.16 | 20.89 | 3.21 |
| DAP 2W Recycle | −80 | 88.5 | 60 | 10 | 46.34 | 17.61 | 2.64 | 43.88 | 20.79 | 3.18 |
| DAP 2W Recycle | −10:+20 | 1420.5 | 60 | 20 | 46.30 | 17.69 | 2.27 | 45.15 | 18.89 | 1.20 |
| DAP 2W Recycle | −20:+48 | 569 | 60 | 20 | 46.38 | 17.60 | 2.54 | 43.64 | 21.30 | 3.70 |
| DAP 2W Recycle | −48:+80 | 237 | 60 | 20 | 43.21 | 17.68 | 2.64 | 46.00 | 21.92 | 4.24 |
| DAP 2W Recycle | −80 | 88.5 | 60 | 20 | 43.51 | 17.61 | 2.64 | 46.34 | 21.23 | 3.62 |
| DAP1 Gran Feed (Recycle) | −10:+20 | 1420.5 | 85 | 5 | 46.8 | 17.59 | 2.19 | 45.88 | 17.93 | 0.34 |
| DAP1 Gran Feed (Recycle) | −20:+48 | 569 | 85 | 5 | 45.99 | 17.68 | 2.31 | 45.04 | 19.01 | 1.33 |
| DAP1 Gran Feed (Recycle) | −48:+80 | 237 | 85 | 5 | 46.14 | 17.63 | 2.41 | 44.09 | 20.13 | 2.50 |
| DAP1 Gran Feed (Recycle) | −80 | 88.5 | 85 | 5 | 47.01 | 17.66 | 2.17 | 44.47 | 20.34 | 2.68 |
| DAP1 Gran Feed (Recycle) | −10:+20 | 1420.5 | 85 | 10 | 46.8 | 17.59 | 2.19 | 45.38 | 18.23 | 0.64 |
| DAP1 Gran Feed (Recycle) | −20:+48 | 569 | 85 | 10 | 45.99 | 17.68 | 2.31 | 44.22 | 20.02 | 2.34 |
| DAP1 Gran Feed (Recycle) | −48:+80 | 237 | 85 | 10 | 46.14 | 17.63 | 2.41 | 43.82 | 20.90 | 3.27 |
| DAP1 Gran Feed (Recycle) | −80 | 88.5 | 85 | 10 | 47.01 | 17.66 | 2.17 | 43.99 | 20.79 | 3.13 |

Under a given set of ammonia pressure, contact time and moisture conditions, smaller DAP particles adsorb significantly more ammonia than larger particles. However, due the limited quantity of smaller DAP particles normally present in the DAP recycle, this effect may be of minimal practical use.

EXAMPLE H

The effect of temperature on ammonia adsorption was determined by heating samples of DAP recycle, placing them in a preheated reactor and then treating the samples with ammonia at elevated pressures. These results were then compared with samples of DAP recycle at room temperature that were treated with pressurized ammonia in the same manner (with the reactor at room temperature). The results of these tests are set forth in Table 10.

TABLE 10

| | Initial Recycle Analysis | | | Ammoniation Conditions | | | | Product Recycle Analysis | | |
|---|---|---|---|---|---|---|---|---|---|---|
| TEST | % $P_2O_5$ | % $N^{(1)}$ | % $H_2O$ | Average Size (microns | $NH_3$ Pressure (psia) | Contact Time (min) | Initial Recycle Temp. °F. | Average Reaction Temp. °F. | % $P_2O_5$ | % $N^{(1)}$ | % N Increase |
| 1 | 45.63 | 17.45 | 1.82 | 1100 | 85 | 10 | 68.4 | 118.9 | 44.20 | 19.56 | 2.12 |
| 2 | 46.26 | 17.71 | 1.22 | 1098 | 85 | 10 | 166.0 | 169.0 | 45.30 | 19.04 | 1.34 |
| 3 | 46.06 | 17.75 | 0.82 | 1131 | 85 | 10 | 162.9 | 166.2 | 45.59 | 18.93 | 1.19 |
| 4 | 45.47 | 17.52 | 2.63 | 1176 | 85 | 10 | 137.0 | 166.6 | 44.51 | 19.68 | 2.17 |
| 5 | 45.93 | 17.56 | 1.75 | 1167 | 85 | 10 | 171.8 | 199.1 | 45.62 | 19.00 | 1.44 |
| 6 | 45.68 | 17.58 | 2.00 | 1139 | 85 | 5 | 71.6 | 107.5 | 45.10 | 18.31 | 0.73 |
| 7 | 44.68 | 17.33 | 4.08 | 1174 | 85 | 10 | 133.5 | 178.5 | 43.43 | 19.62 | 2.29 |
| 8 | 45.45 | 17.52 | 2.33 | 1219 | 85 | 10 | 144.6 | 173.3 | 44.67 | 19.07 | 1.55 |
| 9 | 45.10 | 17.54 | 1.92 | 1139 | 85 | 10 | 123.0 | 163.7 | 44.21 | 19.36 | 1.82 |
| 10 | 46.23 | 17.38 | 0.65 | 1350 | 85 | 10 | 79.8 | 86.3 | 45.86 | 17.67 | 0.30 |
| 11 | 45.76 | 17.13 | 2.20 | 1346 | 85 | 10 | 78.3 | 122.0 | 44.83 | 18.71 | 1.58 |
| 12 | 45.95 | 17.24 | 1.78 | 1356 | 85 | 10 | 169.3 | 183.4 | 45.38 | 18.50 | 1.26 |
| 13 | 45.83 | 17.39 | 2.12 | 1354 | 85 | 10 | 172.6 | 193.4 | 45.16 | 18.60 | 1.21 |
| 14 | 45.67 | 16.91 | 2.92 | 1398 | 75 | 10 | 148.8 | 177.9 | 44.70 | 18.64 | 1.74 |
| 15 | 45.55 | 17.09 | 2.33 | 1288 | 85 | 5 | 163.4 | 202.4 | 45.39 | 18.37 | 1.29 |
| 16 | 45.43 | 16.90 | 3.56 | 1236 | 85 | 10 | 138.6 | 186.4 | 44.63 | 18.99 | 2.10 |
| 17 | 45.19 | 16.82 | 3.98 | 1280 | 85 | 10 | 150.1 | 193.0 | 44.38 | 18.85 | 2.03 |
| 18 | 45.39 | 16.94 | 3.55 | 1235 | 85 | 10 | 77.9 | 183.8 | 44.09 | 19.25 | 2.31 |
| 19 | 46.09 | 17.29 | 1.65 | 1104 | 85 | 10 | 81.2 | 121.7 | 45.24 | 18.27 | 0.98 |
| 20 | 46.18 | 17.22 | 1.90 | 1062 | 75 | 5 | 83.4 | 115.5 | 45.36 | 18.15 | 0.93 |
| 21 | 46.25 | 17.27 | 1.86 | 1016 | 65 | 15 | 83.9 | 136.7 | 45.16 | 18.72 | 1.46 |
| 22 | 46.18 | 17.27 | 2.11 | 996 | 85 | 10 | 174.0 | 205.8 | 45.54 | 19.04 | 1.77 |
| 23 | 46.18 | 17.35 | 1.99 | 1075 | 95 | 5 | 168.3 | 194.1 | 45.85 | 18.64 | 1.29 |
| 24 | 45.90 | 17.40 | 1.66 | 1216 | 75 | 15 | 176.0 | 199.0 | 44.98 | 19.06 | 1.66 |
| 25 | 46.01 | 17.20 | 1.85 | 1187 | 85 | 15 | 171.2 | 198.2 | 45.17 | 18.64 | 1.44 |
| 26 | 45.88 | 17.30 | 1.90 | 1215 | 75 | 5 | 180.4 | 211.7 | 45.45 | 18.14 | 0.84 |
| 27 | 45.86 | 17.38 | 1.42 | 1242 | 95 | 10 | 166.4 | 204.9 | 44.41 | 19.04 | 1.66 |
| 28 | 45.71 | 17.24 | 2.04 | 1078 | 95 | 15 | 174.0 | 197.8 | 45.10 | 18.85 | 1.62 |
| 29 | 46.14 | 17.34 | 1.68 | 1231 | 95 | 10 | 174.4 | 199.3 | 45.29 | 18.69 | 1.35 |

TABLE 10-continued

|  | Initial Recycle Analysis | | | | Ammoniation Conditions | | | | Product Recycle Analysis | | |
| --- | --- | --- | --- | --- | --- | --- | --- | --- | --- | --- | --- |
| TEST | % $P_2O_5$ | % $N^{(1)}$ | % $H_2O$ | Average Size (microns) | $NH_3$ Pressure (psia) | Contact Time (min) | Initial Recycle Temp. °F. | Average Reaction Temp. °F. | % $P_2O_5$ | % $N^{(1)}$ | % N Increase |
| 30 | 46.07 | 17.36 | 1.54 | 1234 | 45 | 10 | 175.3 | 195.1 | 45.77 | 18.08 | 0.72 |
| 31 | 45.85 | 17.42 | 1.87 | 1154 | 65 | 5 | 168.5 | 196.3 | 45.65 | 18.71 | 1.29 |
| 32 | 45.91 | 17.15 | 1.52 | 1294 | 45 | 5 | 181.6 | 190.5 | 45.75 | 17.89 | 0.74 |
| 33 | 46.39 | 17.54 | 1.16 | 1247 | 45 | 15 | 186.3 | 185.4 | 46.18 | 18.26 | 0.72 |
| 34 | 45.88 | 17.40 | 1.32 | 1260 | 35 | 10 | 166.7 | 179.2 | 45.71 | 18.19 | 0.79 |
| 35 | 45.87 | 17.41 | 1.63 | 1298 | 65 | 5 | 157.3 | 190.4 | 45.28 | 18.52 | 1.12 |
| 36 | 46.11 | 17.53 | 1.30 | 1264 | 65 | 10 | 179.9 | 204.3 | 45.33 | 18.51 | 0.98 |
| 37 | 45.55 | 17.29 | 1.69 | 1252 | 55 | 15 | 168.9 | 183.2 | 44.80 | 18.89 | 1.60 |
| 38 | 45.83 | 17.45 | 1.08 | 1252 | 55 | 10 | 170.4 | 187.6 | 45.24 | 18.43 | 0.98 |
| 39 | 45.82 | 17.43 | 1.22 | 1184 | 55 | 5 | 172.2 | 198.1 | 46.03 | 18.13 | 0.70 |
| 40 | 45.90 | 17.26 | 1.50 | 1129 | 35 | 10 | 171.2 | 183.5 | 45.66 | 1769 | 0.43 |
| 41 | 45.80 | 17.32 | 1.73 | 1247 | 35 | 15 | 163.2 | 174.5 | 44.95 | 18.77 | 1.46 |
| 42 | 45.52 | 17.39 | 1.30 | 1208 | 35 | 10 | 66.7 | 83.6 | 45.17 | 18.05 | 0.66 |
| 43 | 45.75 | 17.53 | 1.35 | 1254 | 35 | 15 | 70.0 | 92.5 | 45.24 | 18.27 | 0.74 |
| 44 | 45.61 | 17.53 | 1.39 | 1043 | 35 | 5 | 72.5 | 97.1 | 45.39 | 18.19 | 0.66 |
| 45 | 45.66 | 17.48 | 1.25 | 1103 | 35 | 10 | 173.9 | 194.6 | 45.07 | 18.67 | 1.20 |
| 46 | 46.70 | 17.65 | 1.14 | 838 | 85 | 10 | 157.2 | 174.7 | 46.15 | 18.21 | 0.56 |
| 47 | 46.50 | 17.66 | 1.05 | 809 | 85 | 5 | 209.5 | 234.7 | 46.47 | 18.41 | 0.75 |
| 48 | 46.21 | 17.65 | 1.03 | 950 | 85 | 5 | 73.4 | 138.3 | 45.34 | 18.85 | 1.21 |
| 49 | 46.78 | 17.66 | 1.06 | 795 | 35 | 10 | 74.7 | 106.9 | 45.29 | 18.94 | 1.29 |
| 50 | 46.25 | 17.65 | 0.93 | 939 | 85 | 10 | 74.2 | 129.6 | 44.78 | 19.42 | 1.77 |
| 51 | 46.49 | 17.58 | 1.06 | 1038 | 85 | 15 | 72.7 | 138.7 | 44.91 | 19.45 | 1.87 |
| 52 | 46.69 | 17.64 | 0.74 | 1026 | 85 | 15 | 173.3 | 213.9 | 45.18 | 19.30 | 1.66 |
| 53 | 46.75 | 17.63 | 0.78 | 904 | 35 | 10 | 178.4 | 192.0 | 45.94 | 18.31 | 0.68 |
| 54 | 46.56 | 17.61 | 1.07 | 869 | 35 | 15 | 85.9 | 124.3 | 45.66 | 18.61 | 1.00 |
| 55 | 46.52 | 17.69 | 1.00 | 961 | 35 | 5 | 80.2 | 121.2 | 45.69 | 18.57 | 0.88 |
| 56 | 46.55 | 17.63 | 1.01 | 801 | 35 | 15 | 159.4 | 181.1 | 45.86 | 18.81 | 1.18 |
| 57 | 46.45 | 17.67 | 1.01 | 746 | 35 | 5 | 171.3 | 197.9 | 46.25 | 18.15 | 0.48 |

Note:
$^{(1)}$Ammoniacal nitrogen.

Based on a statistical analysis of the data from these tests, the starting temperature of the DAP recycle, within the range of about 65° to about 200°, was found to be a statistically insignificant variable for the percent nitrogen increase resulting from the treatment of the recycle with high pressure ammonia.

The following regression equation has been calculated incorporating particle size as a fourth independent variable:

%N increase=0.0079×$NH_3$ Pressure (psia)+0.088×Contact Time (min.)+0.540×Initial % Moisture−0.333×Particle Area+0.297

The particle size is expressed in the above regression equation as the surface area (Particle Area) in units of millimeters squared. Assuming the particles are spheres, the surface area is a direct function of the particle size (particle diameter) according to the following equation:

Area (mm$^2$)=4π(d/2)$^2$, where d is the particle diameter in millimeters (1 mm=1000 microns) and π is the constant Pi.

The data shown in Tables 9 and 10 was used to derive the above regression equation. The coefficients in the above regression equation differ somewhat from the coefficients in the regression equation having only three independent variables ($NH_3$ Pressure, Contact Time and Initial % Moisture) because the variation in the dependent variable (%N Increase) is now spread over four independent variables, rather than three independent variables. Also, it is important to realized that the particle size (and, thus, particle area) is an average particle size.

EXAMPLE I

Since operating a commercial diammonium phosphate plant wherein the entire recycle stream is treated with high pressure ammonia might be impractical, batch granulation tests were run in which 15 percent by weight of the recycle was treated with high pressure ammonia. This recycle was then combined with "normal" recycle, and mixed with DAP plant reactor slurry, and such composition was placed in a batch granulator where additional ammonia was added. The apparatus for and the procedure described above was used.

This example had several objectives. One objective was to determine if the pressure-ammoniated DAP recycle could be incorporated into DAP product and retain the added ammonia when the DAP was dried. Another objective was to determine if the effectiveness of the pressure ammoniation would decrease with DAP recycle that was derived from DAP product made using pressure-treated recycle.

Based on actual and estimated chemical analyses, the required quantities of normal recycle, pressure treated recycle, reactor slurry (phosphoric acid ammoniated to an N/P mole ratio of about 1.5) and ammonia were calculated. The normal recycle and pressure treated recycle were then combined in a slow speed solids mixer and the hot (about 260° F.) reactor slurry was blended in. The resultant mixture was next placed in the preheated batch granulator and a measured quantity of ammonia was added to the tumbling bed of solids. Following the ammonia addition, air was passed through the granulator to purge any unreacted ammonia and trap it in the scrubber attached to the granulator exhaust. The material from the granulator was then placed in a laboratory oven and dried for 30 minutes at about 225° F.

Except as noted, plant reactor slurry was used in all of the tests. The normal recycle for the first test (I-12) was obtained from a DAP plant and the ammoniated recycle was obtained from a previous ammoniation test (according to the invention). For all subsequent tests (I-13 to I-18), the recycle was obtained from the previous test (i.e., the recycle for test I-13 was obtained from test I-12, the recycle for test I-14 was obtained from test I-13, etc.). A portion of the recycle (about 15 percent of the total) was ammoniated for 10 minutes at an ammonia pressure of 85 psia. During each test samples were collected at various stages in the procedure to check for ammonia loses and establish a component mass balance.

The test results are set forth in Table 11.

product made with pressure ammoniated recycle, showed no decrease in ammonia adsorption ability.

EXAMPLE J

A series of pilot scale tests were run to determine the utility of the present invention. The objectives of the pilot test were to integrate the process of treating a portion of the recycle with ammonia at an elevated pressure into a continuous DAP production process, to determine how much of

TABLE 11

| Test | I-12 | I-13[1] | I-14 | I-15 | I-16 | I-17 | I-18 |
|---|---|---|---|---|---|---|---|
| Standard Recycle | | | | | | | |
| Weight, gms | 1275.01 | 1275.05 | 1275.05 | 1275.05 | 1275.08 | 1105.04 | 1190.03 |
| % $P_2O_5$ | 46.54 | 45.07 | 45.95 | 45.19 | 44.64 | 45.54 | 45.52 |
| % N | 17.66 | 17.84 | 17.88 | 17.98 | 18.00 | 18.07 | 18.06 |
| % $H_2O$[3] | 1.14 | 1.59 | 1.88 | 3.01 | 2.70 | 2.53 | 2.49 |
| Ammoniated Recycle[2] | | | | | | | |
| Weight, gms | 225.14 | 225.28 | 225.20 | 226.06 | 225.23 | 195.25[5] | 210.35 |
| % $P_2O_5$ | 44.42 | 44.00 | 43.92 | 43.51 | 42.71 | 42.05 | 43.12 |
| % N | 20.15 | 19.98 | 20.32 | 20.62 | 21.06 | 21.64 | 21.52 |
| % $H_2O$[3] | 2.20 | 3.23 | 4.87 | 5.69 | 5.74 | 6.28 | 6.97 |
| Reactor Slurry | | | | | | | |
| Weight, gms | 466.83 | 473.82 | 510.25 | 471.69 | 470.70 | 651.76[6] | 510.08[7] |
| % $P_2O_5$ | 44.40 | 43.52 | 43.82 | 43.47 | 43.31 | 48.97 | 40.14 |
| % N | 13.69 | 13.83 | 13.80 | 13.75 | 13.52 | 13.63 | 12.28 |
| % $H_2O$[4] | 11.80 | 7.52 | 8.55 | 7.84 | 8.88 | 11.67 | 16.25 |
| Dried Product Analysis | | | | | | | |
| % $P_2O_5$ | 45.49 | 45.30 | 45.14 | 44.72 | 44.62 | 45.63 | 45.71 |
| % N | 17.90 | 18.13 | 18.15 | 18.05 | 18.10 | 18.18 | 18.02 |
| % $H_2O$[3] | 1.45 | 1.70 | 2.24 | 3.01 | 2.44 | 2.73 | 2.43 |
| Mole Ratio | 1.99 | 2.03 | 2.04 | 2.05 | 2.06 | 2.02 | 2.00 |
| Component Mass Balance, % | | | | | | | |
| $P_2O_5$ | 104.76 | 102.36 | 104.97 | 104.85 | 104.44 | 107.86 | 102.63 |
| N | 97.04 | 97.73 | 97.09 | 95.29 | 95.29 | 90.13 | 98.16 |
| % N Loss-Granulator | 1.07 | −0.80 | −1.14 | 0.34 | 1.03 | 5.35 | −0.56 |
| % N Loss-Dryer inc. Samples (8) | −1.06% | −0.56% | 0.53% | 0.95% | 0.54% | 0.29% | −1.04% |

Notes:

(1) Starting with Test 13, recycle was a portion of the dried product from the previous test.

(2) Ammoniation conditions; 85 psia ammonia, contact time 10 minutes.

(3) Vacuum oven method.

(4) Karl Fisher method.

(5) −14 mesh recycle used in pressure ammoniation.

(6) Additional phosphoric acid added to slurry.

(7) Slurry diluted with water.

(8) inc. =including (i.e., the nitrogen loss due to samples collected before drying was accounted for in the calculations).

From the second test (I-1 3) onward, the product analyses show nitrogen concentrations above 18 percent. In fact, a problem during the series of tests was keeping the nitrogen concentration low enough to prevent excessive dilution (by the ammonia) of the $P_2O_5$.

Pressure ammoniating 15 percent of the total recycle was sufficient to increase the ammoniacal nitrogen concentration of the DAP product to 18 percent. In addition, repeat pressure ammoniations of DAP recycle derived from DAP the nitrogen grade of the DAP product could be increased by treating a portion of the recycle and to produce a large quantity of DAP product that could be evaluated for physical properties and storage characteristics.

Figure 5:
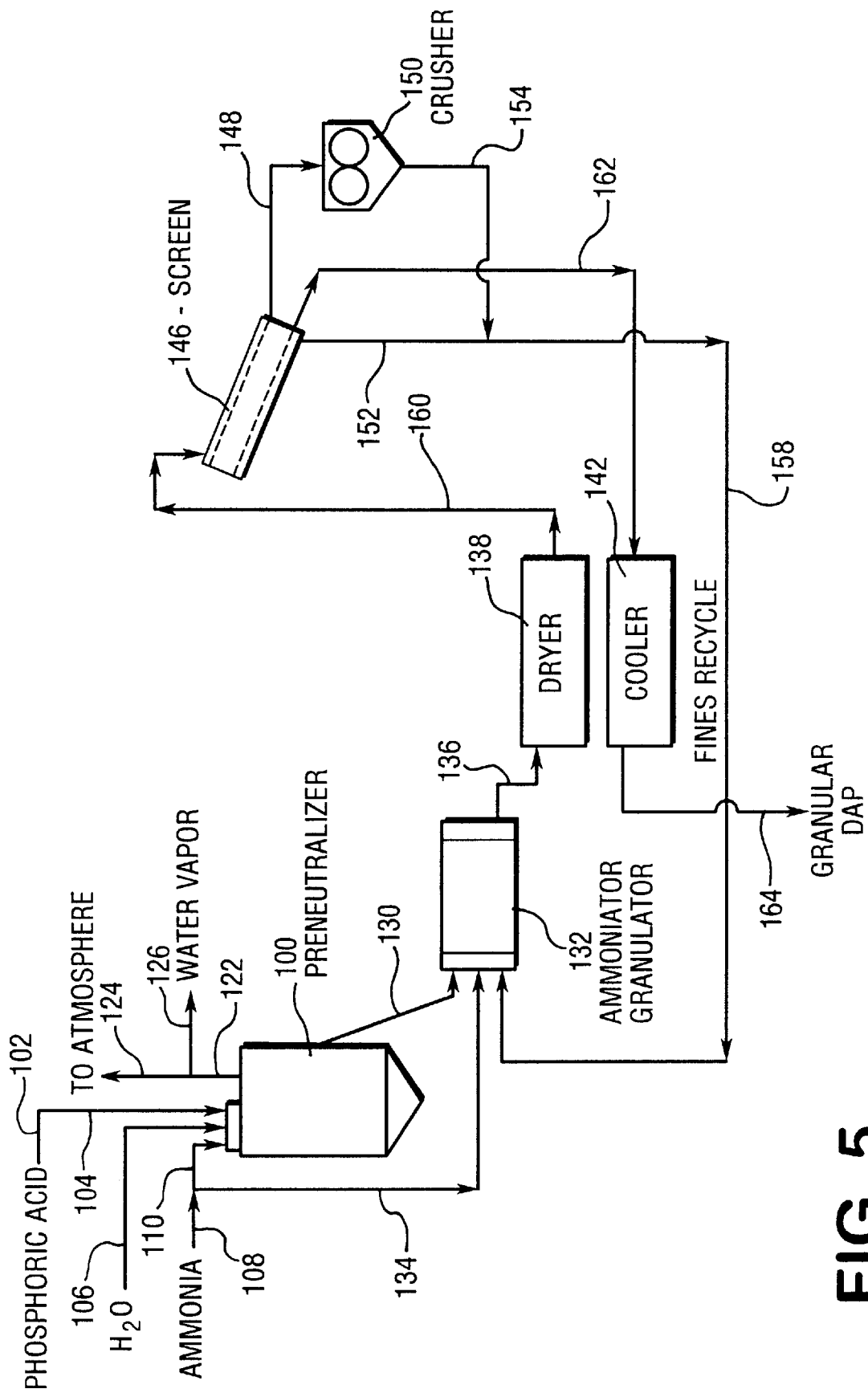
FIG. 5 is a schematic of the pilot plant used in Example J for the production of DAP.
Figure 6:
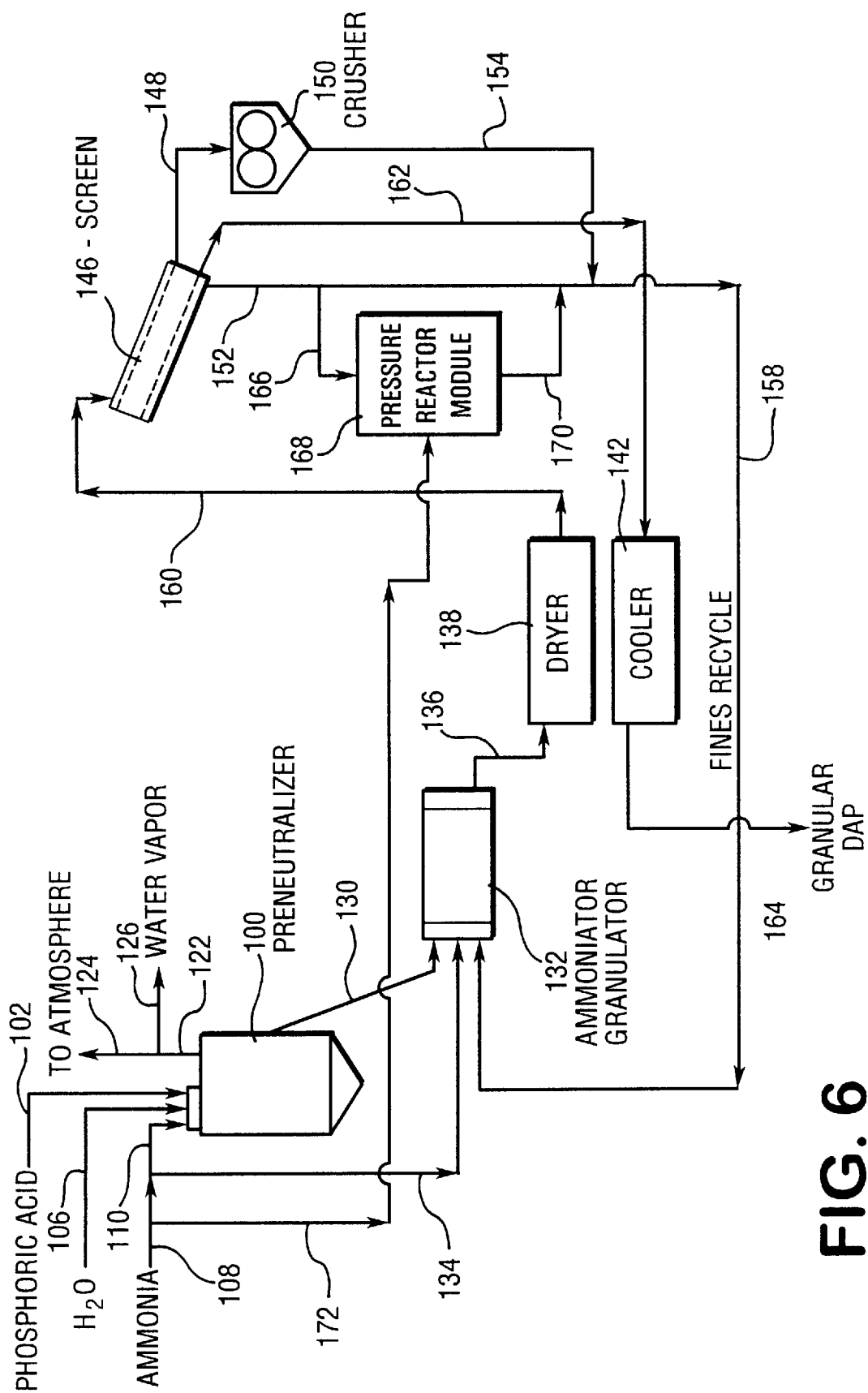
FIG. 6 is a schematic of the DAP pilot plant of FIG. 5 showing the location of the pressure reactor module.

The pilot plant was capable of producing a maximum of about 900 pounds per hour of DAP and contained all of the major unit operations of a typical DAP plant, except the (ammonia) scrubber. FIG. 5 is a schematic of the pilot plant for the production of DAP. FIG. 6 is a schematic of the DAP pilot plant showing the location of the pressure reactor module and FIG. 7 is a schematic showing the details of how the pressure reactor module was integrated into the DAP pilot plant.

In FIG. 5 (also see FIG. 6), phosphoric acid (30 to 54 percent $P_2O_5$) is fed into the top of the preneutralizer (reaction tank) 100 via lines 102 and 104. Water is fed into the top of the preneutralizer 100 via line 106. Ammonia is fed into the preneutralizer 100 via lines 108 and 110, and is normally conveyed to a point below the liquid level in the tank. The phosphoric acid is partially preneutralized by the ammonia in preneutralizer 100. The heat of reaction of ammonia and phosphoric acid is used to evaporate water in preneutralizer 100. Preneutralizer 100 is vented to the atmosphere via top lines 122 and 124 with water vapor coming off via line 126. The solution of the partially preneutralized phosphoric acid is fed from preneutralizer 100 via line 130 to rotary ammoniator-granulator 132. Further ammonia is fed via lines 108 and 134 into ammoniator-granulator 132, wherein the ammoniation is completed. Excess ammonia is required in ammoniator-granulator 132 to produce DAP. The granular product from ammoniator-granulator 132 is fed via line 136 into dryer 138. The granular material from dryer 138 goes via line 160 directly to screen 146. The sized granular DAP is removed via line 156 from screen 146 and sent via line 162 into cooler 142. The sized granular DAP is removed from cooler 142 via line 164. The oversized granular DAP is removed from screen 146 and fed via line 148 into crusher 150. The crushed DAP exits from crusher 150 via line 154 and is mixed with the undersized granular DAP from line 152, to form a mixture of fines. The fines mixture is recycled via line 158 into the front end of ammoniator-granulator 132. Product size DAP can also be included in the recycle stream to aid in ammoniator-granulator operation.

Referring to FIG. 6, to accomplish the high-pressure ammonia treatment of the DAP recycle, pilot-scale pressure reactor module 168 was fabricated to be integrated into the DAP pilot plant. Pressure reactor module 168 is connected to line 152 via inlet line 166 and outlet line 170. Ammonia is fed via lines 108 and 172 into pressure reactor module 168.

Figure 7:
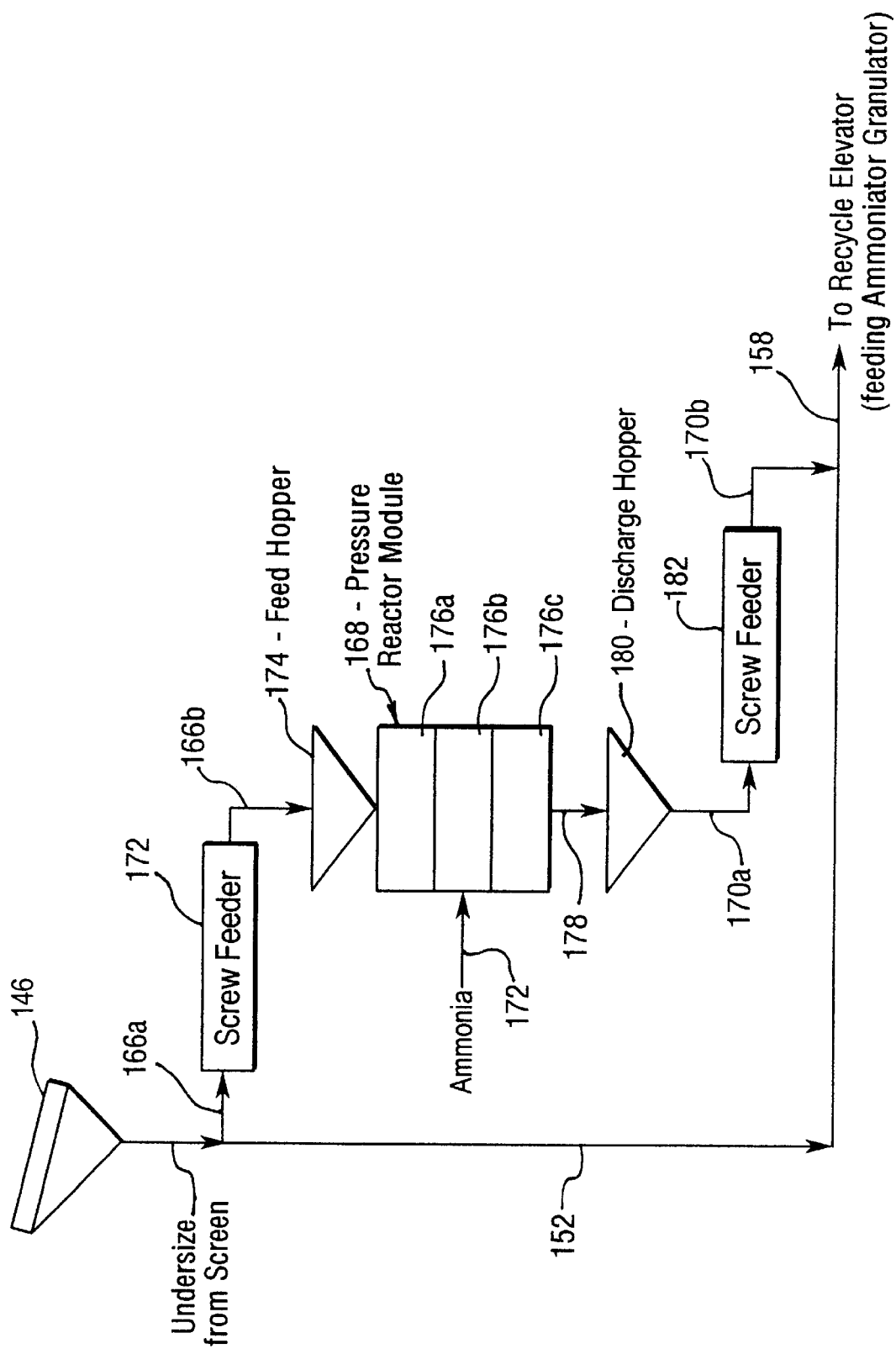
FIG. 7 is a schematic showing the details of how the pressure reactor module is integrated into the DAP pilot plant of FIG. 5.

Referring to FIG. 7, pressure reactor module 168 is composed of feed hopper 174, three pressure vessels 176a, 176b and 176c, and discharge hopper (conveyor) 180 (plus various piping, valves and controls, which are not shown). Undersize DAP exits screen 146 via line 152. Part or all of the undersize DAP in line 152 is diverted via lines 166a and 166b (with the aid of screw feeder 172) into feed hopper 174. Such undersize DAP is fed into the top of pressure reactor module 168, specifically top pressure vessel 176a, and passes downward through pressure vessels 176b and 176c. Ammonia from line 172 is passed into middle pressure vessel 176b. The undersized DAP is thereby enriched with ammonia. The ammonia-enriched DAP exits the bottom of pressure reactor module 168 via line 178 into discharge hopper 180, and moves from hopper 180 via line 170a into screw feeder 182 and from screw feeder 182 via line 170b into fines recycle line 158 (or into ammoniator-granulator 132).

Pressure reactor module 168, shown in FIG. 7, is designed to ammoniate the recycle on a batch basis, but by using feed hopper 174 and discharge hopper 180 as surge vessels, the removal of untreated recycle from the overall recycle flow and the discharge of ammonia enriched recycle back to the pilot plant ammoniator granulator 132 is essentially continuous.

Two types of tests were run, control tests and pressure reactor module tests. During the control tests none of the recycle was treated with ammonia in the pressure reactor module and the pilot plant was operated in a manner consistent with a conventional TVA DAP plant. The purpose of these tests was to establish a baseline, in terms of DAP product nitrogen concentration, for comparison with the pressure reactor module tests. During the pressure reactor module tests a portion of the undersize recycle was diverted to the pressure reactor module, treated with ammonia at elevated pressure for a given amount of time and then recombined with the untreated recycle going to the ammoniator granulator.

Table 12 shows the results of the first control test (Control Test No. 1). As used in Table 12 (and Tables 13, 14 and 15 below), the Slurry Mole Ratio is the molar concentration of nitrogen divided by the molar concentration of phosphorus in the partially neutralized phosphoric acid going from the preneutralizer (100) via line 130 (in FIG. 1) to the ammoniator granulator (132), the Recycle Ratio is the weight of recycle (line 158 in FIG. 1) divided by the weight of granular DAP product (line 156 in FIG. 1) and the Product Mole Ratio is the molar concentration of nitrogen divided by the molar concentration of phosphorus in the granular DAP product. In the Feed Acid Analysis section at the bottom of Table 12 (and Tables 13, 14 and 15 below), the KF $H_2O$ is the percent free water in the acid by the Karl Fischer method. The granular DAP product from this test contained an average 46.57 percent of $P_2O_5$ and an average 17.99 percent of nitrogen.

TABLE 12

Control Test #1

| Operating Time (Hours) | Slurry Mole Ratio | DAP Production Rate (Lbs/Hr) | Recycle Ratio | % N | % $P_2O_5$ | % Moist | Product Mole Ratio |
|---|---|---|---|---|---|---|---|
| 0.50 | 1.48 | | | | | | |
| 1.00 | 1.51 | | | | | | |
| 1.50 | 1.45 | 796 | 4.9 | 17.90 | 46.71 | | 1.94 |
| 2.00 | 1.43 | 946 | 4.0 | | | | |
| 2.50 | 1.44 | 781 | 4.1 | 18.09 | 47.06 | | 1.95 |
| 3.00 | 1.43 | 1027 | 3.2 | | | | |
| 3.50 | 1.43 | 904 | 3.9 | 18.02 | 46.56 | | 1.96 |
| 4.00 | 1.48 | 961 | 3.4 | | | | |
| 4.50 | 1.43 | 889 | 3.5 | 18.03 | 46.43 | | 1.97 |
| 5.00 | 1.42 | 1023 | 3.6 | | | | |
| 5.50 | 1.42 | 836 | 3.7 | 17.93 | 46.41 | | 1.96 |
| 6.00 | 1.42 | 777 | 4.1 | | | | |
| 6.50 | 1.43 | 858 | 3.7 | 17.98 | 46.53 | | 1.96 |
| 7.00 | 1.48 | 871 | 3.5 | | | | |
| 7.50 | | 783 | 4.1 | 17.97 | 46.28 | 0.99 | 1.97 |
| Average | 1.45 | 881 | 3.8 | 17.99 | 46.57 | 0.99 | 1.96 |

| % $P_2O_5$ | % $Fe_2O_3$ | % $Al_2O_3$ | % MgO | % $SO_4$ | % CaO | % Solids | KF $H_2O$ |
|---|---|---|---|---|---|---|---|
| 39.62 | 1.84 | 1.35 | 1.08 | 3.47 | 0.13 | 1.81 | 36.33 |

Table 13 shows the results of the first test using the pressure reactor module (Pressure Reactor Module Test #1). During this test an average of 389 pounds per hour of undersize recycle was processed through the pressure reactor, where it was treated with gaseous anhydrous ammonia, at a pressure of 90 psia for average time of 14.75 minutes. The granular DAP product from this test contained an average 46.12 percent of $P_2O_5$ and an average 18.37 percent of nitrogen. Thus, the nitrogen concentration of the product was 0.38 percent higher than Control Test No. 1 as a result of the pressure reactor module operation.

| % $P_2O_5$ | % $Fe_2O_3$ | % $Al_2O_3$ | % MgO | % $SO_4$ | % CaO | % Solids | KF $H_2O$ |
|---|---|---|---|---|---|---|---|
| 39.84 | 1.82 | 1.31 | 1.04 | 3.49 | 0.20 | 1.96 | 35.99 |

Table 14 shows the results of the second control test (Control Test No. 2). In this test the feed acid to the preneutralizer (100) contained a somewhat higher solids concentration than the feed acid used in the first test. The granular DAP product from this test contained an average 45.51 percent of $P_2O_5$ and an average 17.90 percent of nitrogen.

TABLE 13

Pressure Reactor Module Test #1

| Operating Time (Hours) | Slurry Mole Ratio | DAP Production Rate (Lbs/Hr) | Reactor Production Rate (Lbs/Hr) | Recycle Ratio | Pressure Reactor Module Analyses | | DAP Product Analyses | | | Product Mole Ratio |
|---|---|---|---|---|---|---|---|---|---|---|
| | | | | | % N | % $P_2O_5$ | % N | % $P_2O_5$ | % Moist | |
| 1 | 1.43 | | | | | | | | | |
| 2 | 1.39 | 361 | | 9.4 | | | | | | |
| 3 | 1.43 | 779 | | 4.1 | | | | | | |
| 4 | 1.42 | 627 | | 6.2 | 18.84 | 45.84 | 18.19 | 46.59 | | 1.98 |
| 4 | 1.41 | 673 | 258 | 5.9 | | | | | | |
| 5 | 1.41 | 612 | 500 | 7.0 | 19.13 | 46.44 | 18.25 | 46.57 | | 1.99 |
| 6 | 1.42 | 697 | 502 | 6.1 | | | | | | |
| 7 | 1.43 | 460 | 501 | 9.0 | 19.11 | 46.35 | 18.46 | 46.73 | | 2.00 |
| 8 | 1.43 | 737 | 256 | 5.7 | | | | | | |
| 9 | 1.45 | 510 | 495 | 8.1 | 19.19 | 46.14 | 18.30 | 46.56 | | 1.99 |
| 10 | 1.46 | 1166 | 488 | 2.9 | | | | | | |
| 11 | 1.47 | 946 | 251 | 3.3 | 19.23 | 46.07 | 18.34 | 46.29 | | 2.01 |
| 12 | 1.46 | 539 | 475 | 4.4 | | | | | | |
| 13 | 1.47 | 546 | 457 | 4.1 | 19.82 | 45.56 | 18.22 | 45.55 | | 2.03 |
| 14 | 1.47 | 625 | 452 | 5.3 | | | | | | |
| 15 | 1.42 | 763 | 222 | 3.7 | 20.28 | 44.97 | 18.38 | 45.82 | | 2.03 |
| 16 | 1.43 | 788 | 228 | 4.0 | | | | | | |
| 17 | 1.52 | 803 | 445 | 3.6 | 20.32 | 44.93 | 18.41 | 45.78 | | 2.04 |
| 18 | 1.46 | 843 | 444 | 3.5 | | | | | | |
| 19 | 1.46 | 581 | 226 | 5.7 | 20.44 | 44.79 | 18.33 | 45.92 | | 2.02 |
| 20 | 1.44 | 803 | 440 | 3.9 | | | | | | |
| 21 | 1.45 | 713 | 443 | 4.2 | 20.41 | 44.71 | 18.51 | 45.78 | | 2.05 |
| 22 | 1.46 | 493 | 217 | 6.3 | | | | | | |
| 23 | | 733 | 436 | 4.2 | 20.56 | 44.64 | 18.50 | 45.95 | | 2.04 |
| 24 | | 662 | 432 | 5.0 | 20.54 | 44.60 | 18.52 | 45.91 | 2.54 | 2.04 |
| Average | 1.44 | 700 | 389 | 5.2 | 19.82 | 45.42 | 18.37 | 46.12 | | 2.02 |

TABLE 14

Control Test #2

| Operating Time (Hours) | Slurry Mole Ratio | DAP Production Rate (Lbs/Hr) | Recycle Ratio | % N | % P$_2$O$_5$ | % Moist | Product Mole Ratio |
|---|---|---|---|---|---|---|---|
| 0.50 | 1.45 | | | | | | |
| 1.00 | 1.48 | 779 | 3.6 | | | | |
| 1.50 | 1.48 | 693 | 3.9 | | | | |
| 2.00 | 1.45 | 700 | 3.7 | | | | |
| 2.50 | 1.44 | 616 | 3.7 | | | | |
| 3.00 | 1.49 | 623 | 3.7 | 17.84 | 45.35 | | 1.99 |
| 3.50 | 1.43 | 825 | 2.7 | | | | |
| 4.00 | 1.41 | 642 | 3.6 | 18.01 | 45.49 | | 2.01 |
| 4.50 | 1.39 | 477 | 5.6 | | | | |
| 5.00 | 1.41 | 524 | 6.7 | 17.78 | 45.66 | | 1.97 |
| 5.50 | 1.41 | 660 | 5.3 | | | | |
| 6.00 | | 620 | 5.6 | 17.96 | 45.52 | 3.02 | 2.00 |
| Average | 1.44 | 651 | 4.4 | 17.90 | 45.51 | 3.02 | 1.99 |

| % P$_2$O$_5$ | % Fe$_2$O$_3$ | % Al$_2$O$_3$ | % MgO | % SO$_4$ | % CaO | % Solids | KF H$_2$O |
|---|---|---|---|---|---|---|---|
| 39.34 | 1.80 | 1.37 | 1.05 | 3.70 | 0.37 | 2.85 | 35.85 |

Table 15 shows the results of the second test using the pressure reactor module (Pressure Reactor Module Test No. 2). During this test an average of 276 pounds per hour of undersize recycle was processed through the pressure reactor, where it was treated with gaseous anhydrous ammonia, at a pressure of 90 psia for average time of 11.9 minutes. The granular DAP product from this test contained an average 45.69 percent of P$_2$O$_5$ and an average 18.27 percent of nitrogen. Thus, the nitrogen concentration of the product was 0.37 percent higher than Control Test No. 2 as a result of the pressure reactor module operation.

In addition, since the DAP product from Pressure Reactor Module Test No. 2 had an N/P mole ratio consistently greater than 2.00, some triammonium phosphate must have been produced and incorporated into the DAP product. Based on the average nitrogen and P$_2$O$_5$ analyses for the DAP product that the amount of triammonium phosphate in the product was about 6.88 percent.

At the conclusion of Pressure Reactor Module Test No. 2, the DAP product was collected and transported to a DAP storage warehouse, where it was stored, as a separate pile, for 2 months. At the conclusion of the 2 month storage period, a random sample of the DAP product was collected from the pile and analyzed. The analytical results indicated the DAP product contained 45.45 percent P$_2$O$_5$ and 18.15 percent ammoniacal nitrogen. Since the N/P mole ratio of the DAP product was still greater than 2.00, some triammonium phosphate was still present in the DAP product.

TABLE 15

Pressure Reactor Module Test #2

| Operating Time (Hours) | Slurry Mole Ratio | DAP Production Rate (Lbs/Hr) | Reactor Production Rate (Lbs/Hr) | Recycle Ratio | Pressure Reactor Module Analyses | | DAP Product Analyses | | | Product Mole Ratio |
|---|---|---|---|---|---|---|---|---|---|---|
| | | | | | % N | % P$_2$O$_5$ | % N | % P$_2$O$_5$ | % Moist | |
| 1 | 1.43 | | | | | | | | | |
| 2 | 1.38 | 548 | 267 | 8.1 | 20.14 | 45.44 | 18.44 | 46.50 | | 2.01 |
| 3 | 1.39 | 711 | 327 | 4.9 | 20.36 | 45.10 | 18.42 | 46.30 | | 2.02 |
| 4 | 1.43 | 702 | 417 | 5.0 | 20.17 | 44.88 | 18.29 | 45.93 | | 2.02 |
| 5 | 1.41 | 659 | 302 | 5.2 | | | 18.16 | 45.67 | | 2.01 |
| 6 | 1.44 | 613 | 126 | 6.6 | 19.56 | 44.60 | 18.21 | 45.42 | | 2.03 |
| 7 | 1.43 | 801 | 188 | 4.8 | 19.98 | 44.33 | 18.19 | 45.58 | | 2.02 |
| 8 | 1.40 | 629 | 260 | 5.5 | 19.78 | 45.17 | 18.15 | 45.71 | 1.56 | 2.01 |
| 9 | 1.43 | 734 | 378 | 4.6 | 19.72 | 45.20 | 18.23 | 45.56 | | 2.03 |
| 10 | 1.44 | 701 | 183 | 5.6 | | | 18.34 | 45.82 | | 2.03 |
| 11 | 1.43 | 757 | 367 | 4.9 | 19.69 | 45.14 | 18.20 | 45.76 | | 2.02 |
| 12 | 1.43 | 804 | 447 | 4.0 | 19.97 | 44.59 | 18.25 | 45.42 | | 2.04 |
| 13 | 1.44 | 806 | 386 | 4.7 | 19.97 | 44.72 | 18.14 | 45.66 | | 2.01 |
| 14 | 1.44 | 746 | 383 | 5.4 | 20.03 | 44.46 | 18.34 | 45.47 | | 2.04 |
| 15 | 1.47 | 726 | 390 | 5.6 | 20.03 | 44.52 | 18.29 | 45.57 | | 2.03 |
| 16 | 1.46 | 769 | 294 | 4.8 | 20.16 | 44.45 | 18.29 | 45.43 | | 2.04 |
| 17 | 1.47 | 690 | 182 | 4.9 | 19.96 | 44.44 | 18.21 | 45.69 | | 2.02 |
| 18 | 1.48 | 748 | 277 | 4.8 | 20.05 | 44.29 | 18.12 | 45.43 | | 2.02 |
| 19 | 1.47 | 735 | 354 | 4.5 | 20.16 | 44.23 | 18.10 | 45.38 | | 2.02 |

TABLE 15-continued

Pressure Reactor Module Test #2

| Operating Time (Hours) | Slurry Mole Ratio | DAP Production Rate (Lbs/Hr) | Reactor Production Rate (Lbs/Hr) | Recycle Ratio | Pressure Reactor Module Analyses | | DAP Product Analyses | | | Product Mole Ratio |
|---|---|---|---|---|---|---|---|---|---|---|
| | | | | | % N | % P$_2$O$_5$ | % N | % P$_2$O$_5$ | % Moist | |
| 20 | 1.47 | 806 | 285 | 4.6 | 20.18 | 44.13 | 18.23 | 45.79 | | 2.02 |
| 21 | 1.46 | 789 | 372 | 4.7 | 19.77 | 44.67 | 18.30 | 45.58 | 0.80 | 2.03 |
| 22 | 1.46 | 805 | 277 | 4.4 | 20.00 | 44.46 | 18.20 | 45.49 | | 2.03 |
| 23 | 1.48 | 666 | 354 | 5.8 | 20.09 | 44.63 | 18.30 | 45.60 | | 2.03 |
| 24 | 1.48 | 514 | 277 | 6.4 | 20.16 | 44.49 | 18.20 | 45.44 | | 2.03 |
| 25 | 1.48 | 587 | 372 | 5.2 | 20.06 | 44.26 | 18.35 | 45.40 | | 2.05 |
| 26 | 1.48 | 285 | 275 | 9.9 | 20.36 | 44.52 | 18.52 | 45.60 | | 2.06 |
| 27 | 1.49 | | 416 | | | | | | | |
| 28 | 1.41 | | 308 | | | | | | | |
| 29 | 1.40 | 266 | 316 | 10.7 | 19.96 | 45.34 | 18.34 | 45.88 | | 2.03 |
| 30 | 1.42 | 431 | 307 | 7.3 | 20.26 | 44.56 | 18.00 | 45.43 | | 2.01 |
| 31 | 1.40 | 597 | 423 | 5.7 | 20.36 | 44.58 | 18.21 | 45.23 | | 2.04 |
| 32 | 1.46 | 608 | 226 | 6.8 | 20.18 | 44.42 | 18.30 | 45.95 | | 2.02 |
| 33 | 1.44 | 680 | 69 | 7.2 | | | 18.35 | 46.13 | | 2.02 |
| 34 | 1.44 | 790 | 269 | 4.8 | 19.85 | 45.17 | 18.21 | 45.86 | | 2.01 |
| 35 | 1.42 | 748 | 452 | 4.2 | 19.87 | 45.37 | 18.35 | 46.01 | | 2.02 |
| 36 | 1.42 | 536 | 333 | 4.6 | 20.29 | 44.40 | 18.07 | 45.21 | | 2.03 |
| 37 | 1.44 | 507 | 282 | 5.5 | 20.29 | 44.64 | 18.40 | 45.89 | | 2.03 |
| 38 | 1.44 | 748 | 149 | 5.4 | 20.20 | 44.76 | 18.37 | 45.88 | | 2.03 |
| 39 | 1.44 | 718 | 307 | 4.2 | 20.21 | 44.84 | 18.26 | 45.67 | | 2.03 |
| 40 | 1.46 | 503 | 307 | 6.1 | 20.38 | 44.58 | 18.40 | 45.91 | | 2.03 |
| 41 | 1.49 | 538 | 299 | 6.5 | 20.18 | 44.93 | 18.34 | 45.60 | | 2.04 |
| 42 | 1.51 | 705 | 413 | 4.8 | 20.38 | 44.83 | 18.40 | 45.69 | | 2.04 |
| 43 | 1.49 | 586 | 190 | 5.9 | 20.45 | 44.57 | 18.30 | 45.63 | | 2.03 |
| 44 | 1.48 | 730 | 99 | 4.9 | 20.51 | 43.56 | 18.28 | 45.86 | | 2.02 |
| 45 | 1.49 | 706 | 181 | 4.6 | 20.30 | 44.56 | 18.27 | 46.03 | | 2.01 |
| 46 | 1.48 | 596 | 198 | 5.8 | 20.51 | 44.34 | 18.44 | 45.79 | | 2.04 |
| Average | 1.45 | 659 | 295 | 5.6 | 20.11 | 44.65 | 18.27 | 45.69 | 1.18 | 2.03 |

| % P$_2$O$_5$ | % Fe$_2$O$_3$ | % Al$_2$O$_3$ | % MgO | % SO$_4$ | % CaO | % Solids | KF H$_2$O |
|---|---|---|---|---|---|---|---|
| 39.29 | 1.81 | 1.35 | 0.98 | 3.94 | 0.42 | 3.13 | 35.78 |

What is claimed is:

1. A process for enhancing the ammoniacal nitrogen concentration of DAP, comprising subjecting said DAP, which is in finely divided form and which due to the impurities contained in the phosphoric acid used to produce it, contains less than 18.0 percent by weight of ammoniacal nitrogen, but which contains sufficient excess phosphate to compensate for the dilution effect that would be created by the quantity of ammonia necessary to raise the ammoniacal nitrogen concentration to at least 18.0 percent by weight and still contain at least 46.0 percent by weight of phosphate, as P$_2$O$_5$, to anhydrous gaseous ammonia which is at super atmospheric pressure and which is at a temperature sufficient to maintain said ammonia in the gaseous state, such that a quantity of triammonium phosphate (TAP) is incorporated into the DAP that is sufficient to raise the total ammoniacal nitrogen concentration of the DAP to at least 18.0 percent by weight, the quantity of triammonium phosphate formed and the increase in the ammoniacal concentration being a function of the absolute ammonia pressure, the initial moisture content of said DAP and the contact time of the gaseous ammonia with said DAP.

2. The process as claimed in claim 1, wherein the process is conducted so that the absolute ammonia pressure, the initial moisture content and the contact time, that collectively determine the quantity of triammonium phosphate formed, have positive values within the scope of the regression equation:

% Nitrogen increase=0.355×Initial % Moisture+0.027×Contact Time (min.)+0.009×Absolute Ammonia Pressure (psia)−0.240, wherein the coefficients associated with ammonia pressure, the initial percent moisture, the contact time and the constant can each vary plus or minus up to 50 percent.

3. The process as claimed in claim 2, wherein the diammonium phosphate, before being treated with ammonia, is de-aerated by introducing it into a vessel, sealing the vessel and applying a vacuum to the sealed vessel such that the air in the sealed vessel is removed.

4. In a process for the preparation of granular fertilizer grade DAP product comprising partially preneutralizing orthophosphoric acid with ammonia, completing the ammoniation of the orthophosphoric acid with ammonia in a rotary ammoniator-granulator to provide granular DAP, sizing the granular DAP to provide the granular DAP product, reducing the particle size of the oversized granular DAP, and recycling the undersized granular DAP and size-reduced oversized granular DAP to the ammoniator-granulator, wherein, due to impurities contained in the orthophosphoric acid, it is not possible to achieve an ammoniacal nitrogen concentration in the final product of at least 18.0 percent by weight, while still maintaining a phosphate concentration, as P$_2$O$_5$, of at least 46.0 percent by weight, the process improvement comprising enhancing the ammoniacal nitrogen content of the granular DAP recycle, hence the granular DAP product, by reacting the finely-divided DAP recycle with anhydrous gaseous ammonia which is at a super atmospheric pressure and which is at a temperature sufficient to maintain said anhydrous ammonia in the gaseous state such that a quantity of triammonium phosphate (TAP) sufficient to raise the total ammoniacal nitrogen concentration of the DAP product to at least 18.0 percent by weight is formed, whereby the quantity of triammonium phosphate formed and, hence, the increase in the ammoniacal nitrogen concentration is a function of the absolute ammonia pressure, the initial moisture content of the granular DAP recycle, and the contact time of the ammonia with the granular DAP recycle.

5. The process improvement as claimed in claim 4, wherein the process is conducted so that the absolute ammonia pressure, the initial moisture content and the contact time, that collectively determine the quantity of triammonium phosphate formed, have positive values within the scope of the regression equation:

% Nitrogen increase=0.355×Initial % Moisture+0.027×Contact Time (min.)+0.009×Absolute Ammonia Pressure (psia)−0.240, wherein the coefficients associated with ammonia pressure, the initial percent moisture, the contact time and the constant can each vary plus or minus up to 50 percent.

6. The process as claimed in claim 5, wherein the granular fertilizer grade DAP recycle in a first sealed vessel is de-aerated by the application of vacuum, such that the air in the sealed vessel is removed, and the de-aerated, granular DAP recycle is subjected in a second sealed vessel to an atmosphere consisting of anhydrous gaseous ammonia, the anhydrous gaseous ammonia being at a pressure of at least 15 psia, for a time period sufficient for the required amount of triammonium phosphate to be formed, such that when the thus treated recycle is introduced into a conventional style ammoniator-granulator, either alone or in combination with other recycle that has not been treated in the above manner and the recycle is sprayed with partially ammonia-neutralized phosphoric acid slurry from the preneutralizer and ammonia is introduced within the slurry coated recycle bed in the ammoniator-granulator, in sufficient quantity and with sufficient excess to convert monoammonium phosphate in the slurry to diammonium phosphate, the resulting product from the ammoniator-granulator, after passing through the conventional rotary dryer, will contain at least 18.0 percent by weight of ammoniacal nitrogen, and at least 46.0 percent by weight of phosphate, as $P_2O_5$.

7. The process improvement as claimed in claim 6, wherein the ammonia-treated granular DAP recycle, before being introduced into a conventional TVA style ammoniator-granulator, is transferred to a third sealed vessel and the majority of the excess ammonia, over and above that consumed in the reaction of diammonium phosphate to triammonium phosphate, is removed by vacuum applied to the third vessel.

8. The process improvement as claimed in claim 7, wherein the ammonia-treated granular DAP recycle, enriched with triammonium phosphate, is recycled either alone or in combination with other recycle that has not been treated to a conventional, TVA style ammoniator-granulator.

9. The process as claimed in claim 5, wherein the granular fertilizer grade DAP recycle is placed in a sealed vessel, the granular fertilizer grade DAP recycle is de-aerated by the application of vacuum to the sealed vessel, such that the air in the sealed vessel is removed, anhydrous gaseous ammonia is fed into the sealed vessel until a pressure of at least 15 psia, is obtained in the sealed vessel, and the granular fertilizer grade DAP recycle is kept in contact with the ammonia in the sealed vessel for a time period sufficient for the required amount of triammonium phosphate to be formed, such that when the thus treated DAP recycle is introduced into a conventional TVA style ammoniator-granulator, either alone or in combination with other recycle that has not been treated in the above manner and the recycle is sprayed with partially ammonia-neutralized phosphoric acid slurry from the preneutralizer and ammonia is introduced within the slurry coated recycle bed in the ammoniator-granulator, in sufficient quantity and with sufficient excess to convert monoammonium phosphate in the slurry to diammonium phosphate, the resulting product from the ammoniator-granulator, after passing through the conventional rotary dryer, will contain at least 18.0 percent by weight of ammoniacal nitrogen, and at least 46.0 percent by weight of phosphate, as $P_2O_5$.

10. The process improvement as claimed in claim 9, wherein, at the end of the time period, the majority of the excess ammonia over and above that consumed in the reaction of diammonium phosphate to triammonium phosphate, is removed by vacuum applied to the sealed vessel.

11. The process improvement as claimed in claim 10, wherein the ammonia-treated granular DAP recycle, enriched with triammonium phosphate, is recycled, either alone or in combination with other recycle that has not been treated, to a conventional TVA style ammoniator-granulator.

12. The process improvement as claimed in claim 4, wherein the contact time of the pressurized anhydrous gaseous ammonia with the DAP recycle is between about 0.25 minutes and about 90 minutes.

13. The process improvement as claimed in claim 4, wherein the absoulute pressure of the anhydrous gaseous ammonia is at least 15 pounds per square inch (1.02 atmospheres).

14. The process improvement as claimed in claim 4, wherein the absolute pressure of the anhydrous gaseous ammonia is between about 30 pounds per square inch (2.04 atmospheres) and 100 pounds per square inch (6.80 atmosheres).

15. The process improvement as claimed in claim 4, wherein the particle size of the finely-divided granular DAP recycle is less than 0.0787 inches (9 mesh on the Tyler sieve scale).

16. The process improvement as claimed in claim 4, wherein the initial moisture content of the DAP recycle is between about 0.2 weight percent and about 4 weight percent.

17. The process improvement as claimed in claim 4, wherein the temperature of the pressurized gaseous anhydrous ammonia is between about 45° F. and about 200° F.

18. The process improvement as claimed in claim 4, wherein at least a portion of the granular DAP recycle is fed continuously into a pressure reactor module and pressurized anhydrous gaseous ammonia is continuously fed into the pressure reactor module, said granular DAP recycle being ammonia enriched, by the chemical reaction of the ammonia and the diammonium phosphate contained in the DAP recycle to form triammonium phosphate, and the ammonia-enriched granular DAP recycle is mixed with granular DAP recycle that has not been thus ammonia enriched, and the combined stream are fed into a conventional TVA style ammoniator-granulator.

19. The process improvement as claimed in claim 4, wherein a portion of the granular DAP recycle is introduced into an entry lock vessel at atmospheric pressure, the entry lock vessel is sealed gas tight and then pressurized with gaseous anhydrous ammonia to a total pressure approximately equal to the total pressure in a second reactor vessel, which has a gaseous mixture of no more than 15 weight percent of air and no less than 85 weight percent of ammonia in which the partial pressure of ammonia is at least 1.02 atmospheres, the valve or other means connecting the entry lock vessel to the reactor vessel is opened, the portion of DAP recycle is moved or falls into the second reactor vessel, the valve or other means connecting the entry lock vessel to the reactor vessel is closed, the granular DAP recycle is held in the reactor vessel until the portion of granular DAP recycle is ammonia enriched by chemical reaction between at least some of the diammonium phosphate contained in the DAP recycle and the ammonia in the pressurized ammonia atmosphere, resulting in the formation of triammonium phosphate, and is then transferred into the conventional TVA style ammoniator-granulator, and the gas in the entry lock vessel is vented to a conventional scrubbing system for recovery of the ammonia contained therein.

20. The process as claimed in claim 19, wherein the granular DAP recycle is held in the second reactor vessel for a time period sufficient for the required amount of triammonium phosphate to be formed, such that when the thus treated DAP recycle is introduced into a conventional TVA style ammoniator-granulator, either alone or in combination with other recycle that has not been treated in the above manner and the recycle is sprayed with partially ammonia-neutralized phosphoric acid slurry from the preneutralizer and ammonia is introduced within the slurry coated recycle bed in the ammoniator-granulator, in sufficient quantity and with sufficient excess to convert monoammonium phosphate in the slurry to diammonium phosphate, the triammonium phosphate contained in the thus treated DAP recycle is encapsulated and incorporated into the DAP leaving the ammoniator-granulator, such that after passing through the conventional rotary dryer, the DAP product will contain at least 18.0 percent by weight of ammoniacal nitrogen, and at least 46.0 percent by weight of phosphate, as $P_2O_5$.

21. The process as claimed in claim 6, wherein the anhydrous gaseous pressure is at a pressure of at least 30 psia.

22. The process as claimed in claim 9, wherein the anhydrous gaseous pressure is at a pressure of at least 30 psia.

* * * * *